US011899233B2

United States Patent
Antonis et al.

(10) Patent No.: US 11,899,233 B2
(45) Date of Patent: Feb. 13, 2024

(54) HLD MODULE WITH CAVITY FOR IMPROVED LIGHT COUPLING

(71) Applicant: SIGNIFY HOLDING B.V., Eindhoven (NL)

(72) Inventors: Petrus Hendrikus Antonis, Reusel (NL); Ludovicus Johannes Lambertus Haenen, Sint Oedenrode (NL); Peter Vanpoucke, Eindhoven (NL); Barry Mos, Bocholt (BE); Christoph Gerard August Hoelen, Valkenswaard (NL); Dominique Maria Bruls, Heeze (NL); Simon Eme Kadijk, Veldhoven (NL); Li Yun, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 127 days.

(21) Appl. No.: 17/620,764

(22) PCT Filed: Jun. 17, 2020

(86) PCT No.: PCT/EP2020/066819
§ 371 (c)(1),
(2) Date: Dec. 20, 2021

(87) PCT Pub. No.: WO2020/254439
PCT Pub. Date: Dec. 24, 2020

(65) Prior Publication Data
US 2022/0342136 A1 Oct. 27, 2022

(30) Foreign Application Priority Data
Jun. 21, 2019 (EP) .................................... 19181706

(51) Int. Cl.
*F21V 8/00* (2006.01)

(52) U.S. Cl.
CPC ......... *G02B 6/0003* (2013.01); *G02B 6/0055* (2013.01); *G02B 6/0068* (2013.01); *G02B 6/0085* (2013.01); *G02B 6/0088* (2013.01)

(58) Field of Classification Search
CPC . F21V 8/00; F21V 29/502; F21K 9/61; F21K 9/64; F21Y 103/10; F21Y 115/10;
(Continued)

(56) References Cited

U.S. PATENT DOCUMENTS 7,375,342 B1 * 5/2008 Wedding ................. H01J 11/18
250/385.1
7,791,037 B1 * 9/2010 Wedding ................. H01J 11/18
250/374
(Continued)

FOREIGN PATENT DOCUMENTS

EP 3330605 A1 6/2018
FR 3019656 A1 10/2015
(Continued)

*Primary Examiner* — Thien M Le

(57) ABSTRACT

The invention provides a light generating system (1000), comprising a plurality of light sources (10), an elongated luminescent body (100), and a body holder structure (2000), wherein:
the plurality of light sources (10) are configured to provide light source light (11), wherein the light sources (10) are solid state light sources, wherein the plurality of light sources (10) are configured in a light source array (15);
the elongated luminescent body (100) has a length (L) and a width (W), wherein the elongated luminescent body (100) comprises luminescent material (120) configured to convert at least part of light source light (11) into luminescent material light (8), wherein the elongated luminescent body (100) and the light source array (15) are configured parallel;
the body holder structure (2000) comprises an elongated slit (205) for hosting the elongated luminescent body
(Continued)

(100), wherein the elongated slit (205) has a cavity wall (1205) defining the elongated slit (205) and a slit opening (1206), wherein the slit opening (1206) has a slit opening width (WS1), wherein the cavity wall (1205) and the elongated luminescent body (100) have first shortest distances (d11) that vary over the cavity wall (1205), wherein at least part of the cavity wall (1205) is reflective for light source light (11);

the light sources (10) are configured at second shortest distances (d21) from the elongated luminescent body (100), wherein the second shortest distance (d21) is selected from the range of 40-1000 μm, and wherein one or more of the plurality of light sources (10) are configured to irradiate with the light source light (11) the elongated luminescent body (100) both (i) directly and (ii) indirectly via the cavity wall (1205).

15 Claims, 13 Drawing Sheets

(58) Field of Classification Search
CPC ............ F21Y 2103/10; F21Y 2115/10; G02B 6/0003; G02B 6/0055; G02B 6/0068; G02B 6/0088; G02B 6/0085
See application file for complete search history.

(56) References Cited

U.S. PATENT DOCUMENTS

| | | | |
|---|---|---|---|
| 2002/0114168 A1* | 8/2002 | Pelka | F21S 43/245 362/582 |
| 2005/0063197 A1 | 3/2005 | Nightingale et al. | |
| 2008/0192458 A1* | 8/2008 | Li | G02B 6/005 313/498 |
| 2010/0236625 A1* | 9/2010 | Kenney | H01L 31/0547 136/252 |
| 2011/0146757 A1* | 6/2011 | Rider | G02B 19/0019 359/853 |
| 2015/0023023 A1* | 1/2015 | Livesay | H01L 33/64 362/294 |
| 2018/0363858 A1* | 12/2018 | Peeters | G02B 6/0003 |
| 2019/0056546 A1* | 2/2019 | Vrehen | G02B 6/0085 |
| 2022/0342136 A1* | 10/2022 | Antonis | G02B 6/0085 |

FOREIGN PATENT DOCUMENTS

| | | |
|---|---|---|
| WO | 2006054203 A1 | 5/2006 |
| WO | 2014002726 A1 | 1/2014 |
| WO | 2015101535 A1 | 7/2015 |
| WO | 2019008092 A1 | 1/2019 |

\* cited by examiner

HLD MODULE WITH CAVITY FOR IMPROVED LIGHT COUPLING

CROSS-REFERENCE TO PRIOR APPLICATIONS

This application is the U.S. National Phase application under 35 U.S.C. § 371 of International Application No. PCT/EP2020/066819, filed on Jun. 17, 2020, which claims the benefit of European Patent Application No. 19181706.3, filed on Jun. 21, 2019. These applications are hereby incorporated by reference herein.

FIELD OF THE INVENTION

The invention relates to a light generating system, such as for use in a projector or for use in stage lighting, or for use for microscopy or endoscopy illumination. The invention also relates to a luminaire or projection system comprising such light generating system.

BACKGROUND OF THE INVENTION

Luminescent rods are known in the art. WO2006/054203, for instance, describes a light emitting device comprising at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, characterized in that the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_1 \ldots A_n$ and each of the at least one exit surface(s) having an exit surface area, the exit surface area(s) being numbered $E_1 \ldots E_n$ and the sum of each of the at least one entrance surface(s) area(s) A being $A = A_1 + A_2 \ldots + A_n$ and the sum of each of the at least one exit surface(s) area(s) E being $E = E_1 + E_2 \ldots + E_n$.

EP3330605A1 discloses a fluorescence concentrator system that provides for high brightness light source. The system includes a host doped with fluorescent material, which is optically pumped by an adjacent row of LEDs. A reflective structure surrounds the fluorescence concentrator. The fluorescence concentrator captures a portion of the isotropically emitted fluorescent light and guides it to an output surface. The fluorescent energy emerging the output surface provides a high brightness light source suitable for a number of applications.

SUMMARY OF THE INVENTION

High brightness light sources are interesting for various applications including spots, stage-lighting, headlamps and digital light projection, and (fluorescence) microscopy and endoscopy etc. For this purpose, it is possible to make use of so-called light concentrators where shorter wavelength light is converted to longer wavelengths in a highly transparent luminescent material. A rod of such a transparent luminescent material can be illuminated by LEDs to produce longer wavelengths within the rod. Converted light which will stay in the luminescent material, such as a (trivalent cerium) doped garnet, in the waveguide mode and can then be extracted from one of the (smaller) surfaces leading to an intensity gain.

In embodiments, the light concentrator (or "luminescent concentrator") may comprise a rectangular bar (rod) of a (transparent) phosphor doped, high refractive index garnet, capable to convert blue light into green or yellow light and to collect this green or yellow light in a small &endue output beam. The rectangular bar may have six surfaces, four large surfaces over the length of the bar forming the four side walls, and two smaller surfaces at the end of the bar, with one of these smaller surfaces forming the "nose" where the desired light is extracted.

Under e.g. blue light radiation, the blue light excites the phosphor, after the phosphor start to emit green light in all directions, assuming some cerium comprising garnet applications. Since the phosphor is embedded in—in general—a high refractive index bar, a main part of the converted (green) light is trapped into the high refractive index bar and wave guided e.g. via Total Internal Reflection (TIR) to the nose of the bar where the (green) light may leave the bar. The amount of (green) light generated is proportional to the amount of blue light pumped into the bar. The longer the bar, the more blue LEDs can be applied to pump phosphor material in the bar and the number of blue LEDs to increase the brightness of the (green) light leaving at the nose of the bar can be used. The phosphor converted light, however, can be split into two parts.

A first part consists of first types of light rays that may hit the side walls of the bar under angles larger than the critical angle of reflection. These first light rays may be trapped in the high refractive index bar and will traverse to the nose of the bar where it may leave as desired light of the system. In general, at least part of the luminescent material light may escape from the radiation exit face directly (without total internal reflection). A second part consist of second light rays ("second light rays") may hit the side walls of the bar at angles smaller than the critical angle of reflection. These second light rays are not trapped in the bar but will leave the bar at its side walls. These second light rays may be bounced back into the garnet, but in such cases these light rays will always enter the garnet under angles smaller than the total angle of reflection, will traverse straight through the garnet and leave the bar at the opposite side wall. Such, these second light rays will in principle never channel to the nose of the bar. These second light rays are lost and may limit the efficiency of such illumination systems. Typically, 44% of the converted light may be trapped and may leave the bar at its nose, while 56% of the converted light may be lost at the side walls of the bar.

A high lumen density (HLD) system may comprise a ceramic rod, where blue light is converted to create a high intensity source for theatre lighting, beamers etc. For optical efficiency, i.e. LED alignment with rod, thermal performance, i.e. cooling by conductive heat spreading, and mechanical fixation inside (e.g.) a projector module, the rod may be clamped by metal rod holders.

The rod may be configured in a rod holder ("body holder structure"). A system may e.g. be based on irradiation of the rod with light sources from two sides of the rod. Such rod-holder may e.g. be generated with die-casting.

Relative to some prior art systems, an increase in intensity of the output, an improvement of the efficiency, better thermal management, or more reliability of prior art systems is desirable. Furthermore, it may be desirable to create rod holders that may also be generated with other, e.g. easier production methods like extrusion, or cold forging, that allow for the use of better thermally conductive Aluminum grades. Furthermore, the invention allows a simplified design, with few(er) complex features, resulting in less costly parts.

Hence, it is an aspect of the invention to provide an alternative light generating system (or "lighting system") comprising a luminescent concentrator, which preferably further at least partly obviates one or more of above-described drawbacks and/or which may have a relatively higher efficiency. The present invention may have as object to overcome or ameliorate at least one of the disadvantages of the prior art, or to provide a useful alternative.

Amongst others, the invention proposes to configure an elongated luminescent body in a cavity (or recycling cavity). Hence, a solution may be the use of a recycling cavity. In or close to this cavity a relatively large number of e.g. LEDs can be applied, that can deliver a relatively large amount of optical pump power, e.g. in the range of 100-150 W optical blue light. By using the reflective cavity, it may be possible to couple most of this light (>90%) into e.g. 3 sides of the rod (assuming a rod having a rectangular cross-section), thus eliminating at least partly the disadvantage of a purely single sided irradiation concept, that may use e.g. a U-shaped groove. Furthermore, in this concept a larger number of LEDs can be applied, which means that the module can be operated at lower driving currents in order to achieve the desired optical output. This may result in a much higher Wall Plug Efference (WPE) of the LED pump, and may thus result in an improved lm/Watt performance of the HLD module.

Hence, in an aspect the invention provides a light generating system ("system"), comprising a plurality of light sources, an elongated luminescent body ("elongated body", "luminescent body", "light transmissive body"; sometimes also indicated as "rod"), and a body holder structure ("body holder"). Especially, the plurality of light sources are configured to provide light source light. In embodiments, the light sources are solid state light sources. Especially, the plurality of light sources are configured in a light source array. In embodiments, the elongated luminescent body has a length (L) and a width (W). Especially, the elongated luminescent body comprises luminescent material configured to convert at least part of light source light into luminescent material light. In specific embodiments, the elongated luminescent body and the light source array are configured parallel. Further, especially the body holder structure comprises an elongated slit for hosting the elongated luminescent body. In embodiments, the elongated slit has a cavity wall defining the elongated slit and a slit opening, wherein the slit opening has a slit opening width (WS1). In specific embodiments, WS1≥1.02*W, such as especially WS1≥1.05*W, especially wherein WS1≥1.1*W. Further, especially the cavity wall and the elongated luminescent body have first shortest distances (d11) that may vary over the cavity wall. In specific embodiments, at least part of the cavity wall is reflective for light source light. Yet further, especially the light sources are configured at second shortest distances (d21) from the elongated luminescent body. In embodiments, the second shortest distance (d21) may be selected from the range of 40-1000 μm, though shorter or larger distances may also be possible. One or more of the plurality of light sources may be configured to irradiate with the light source light the elongated luminescent body both (i) directly and (ii) indirectly via the cavity wall.

Hence, especially the invention provides a light generating system, comprising a plurality of light sources, an elongated luminescent body, and a body holder structure, wherein: (a) the plurality of light sources are configured to provide light source light, wherein the light sources are solid state light sources, wherein the plurality of light sources are configured in a light source array; (b) the elongated luminescent body has a length (L) and a width (W), wherein the elongated luminescent body comprises luminescent material configured to convert at least part of light source light into luminescent material light, wherein the elongated luminescent body and the light source array are configured parallel; (c) the body holder structure comprises an elongated slit for hosting the elongated luminescent body, wherein the elongated slit has a cavity wall defining the elongated slit and a slit opening, wherein the slit opening has a slit opening width (WS1), wherein WS1, wherein the cavity wall and the elongated luminescent body have first shortest distances (d11) that vary over the cavity wall, wherein at least part of the cavity wall is reflective for light source light; and wherein one or more of the plurality of light sources are configured to irradiate with the light source light the elongated luminescent body both (i) directly and (ii) indirectly via the cavity wall. Especially, in embodiments (d) the light sources are configured at second shortest distances (d21) from the elongated luminescent body, wherein the second shortest distance (d21) is selected from the range of 40-1000 μm, though smaller or larger may also be possible (see below).

With such system, the light source light may be coupled better into the luminescent body. Larger and/or more solid state light sources may be applied, allowing to couple more light into the luminescent body. Further light source light may (essentially) not be lost, as via (reflection from the) cavity walls the light source light may also enter the luminescent body. Hence, one or more light sources may directly irradiate the elongated luminescent body but simultaneously also indirectly irradiate the elongated luminescent body via one or more reflections in the cavity. Nevertheless, the light sources are configured relatively close to the elongated luminescent body.

In embodiments, the elongated luminescent body and the light sources may be configured such, that at least 50% of the light source light (in Watts) may directly be received by the elongated luminescent body. Further, in embodiments the elongated luminescent body and the light sources may be configured such, that, and at least 10%, such as at least 15%, like even at least 20% of the light source light (in Watts) may indirectly be received by the elongated luminescent body. The term "indirect irradiation" and similar terms indicate light source light that only enters the elongated luminescent body (for the first time) after one or more reflections at the cavity wall. In total, at least 80%, such as at least 85%, like at least 90% of the light source light (in Watts) may directly and indirectly be received by the elongated luminescent body.

In the present invention, in embodiments the elongated slit and the elongated luminescent body may have dimensions such that there may be clearance between one or more of the one or more side faces and the elongated slit. Further, one or more force applying elements, such as one or more spring elements, may be configured to keep the elongated body pushed into the elongated slit. Especially, one or more spring elements exert a force on one or more side faces of the elongated luminescent body. One or more force applying elements, such as one or more spring elements may be added to suspend the rod and to ensure its thermal contact with the block. The herein described design may in embodiments be compatible with many different LED sizes, as the rod may be suspended above the LEDs and not supported on the sides of the rod, leaving more room available for the LEDs. This may allow for LEDs to be used that have almost the same width as the rod, or that are even wider than the rod itself. Furthermore, as in embodiments the inside of the cavity, in which the rod may be clamped, may be reflective, a small mix-box is created, by which light that is emitted from the side plane of the LEDs still has a chance of hitting the rod, after optical recycling. Also, if the rod is thin, or has a (too) low Ce concentration, the reflective cavity can take care of recycling of leaked blue light, thus enabling different rod dimensions and geometries.

As indicated above, the body holder structure comprises an elongated slit for hosting the elongated luminescent body. Hence, the elongated slit, elongated luminescent body, and light source array are all configured parallel. The elongated slit may have cross-sectional dimensions such that the elongated luminescent body can be hosted over its total height, or can even be configured recessed, or can be configure protruding. The elongated slit may have cross-sectional dimensions that may partly be conformal with the shape of the elongated luminescent body, e.g. for thermal energy transfer. However, the cross-sectional dimensions may also be partly such that a cavity is created at both sides of the elongated luminescent body (over its entire height or over part of its height). In this way, light may enter the elongated luminescent body not only via a face configured closest to the light sources (which face may comprise the radiation entrance window), but also via a face configured further away from the light sources, such as side faces. Hence, in such embodiment in fact at least part of such side faces are also used as (second) radiation entrance windows.

Hence, in embodiments the elongated slit has a cavity wall defining the elongated slit and a slit opening. In embodiments, the width of the slit opening is larger than the width of the elongated luminescent body Especially, the width of the slit opening is thus (substantially) larger than the width of the elongated luminescent body. In embodiments, the slit opening has a slit opening width (WS1), wherein WS1≥1.05*W, especially wherein WS1≥1.05*W, especially wherein WS1≥1.1*W.

As indicated above, the cross-sectional dimension may not be fully conformal with the elongated luminescent body, whereby a cavity may be created. Hence, in embodiments the cavity wall and the elongated luminescent body have first shortest distances (d11) that vary over the cavity wall. For instance, one or more of the cavity walls, especially those directed to side faces at an angle, such as perpendicular, to the radiation input face of the elongated luminescent body, may be slanted or may be curved.

Further, for recycling of light at least part of the cavity wall is reflective for light source light, even more especially essentially the entire cavity wall is reflective for light source light. Hence, in this way light source light that is coupled out from the elongated luminescent bar, like being transmitted, may be reflected back into the elongated luminescent body, and generate luminescent material light. See further also below, wherein it is also indicated the cavity wall may (also) be reflective for the luminescent material light.

The light sources may be configured relatively close to the elongated luminescent body. In general however, the (average) distance is not below about 1 μm (see also below). In specific embodiments the light sources are configured at second shortest distances (d21) from the elongated luminescent body, wherein the second shortest distance (d21) in embodiments may be selected from the range of up to about 1000 μm, such as selected from the range of 10-1000 μm, like e.g. 40-1000 μm. In specific embodiments, the second shortest distance (d21) is selected from the range of 10-500 μm. This may minimize thermal coupling (between the LED and the elongated luminescent body) and maximize the input via the indirect pathway. With such system, one or more of the plurality of light sources are configured to irradiate with the light source light the elongated luminescent body both (i) directly and (ii) indirectly via the cavity wall. This may increase the output of the lighting system.

In specific embodiments, also further elucidated below, the elongated luminescent body comprises one or more side faces, wherein the elongated luminescent body comprises a radiation input face and a radiation exit window, wherein the radiation input face is configured in a light receiving relationship with the plurality of light sources, and wherein the one or more of the plurality of light sources are configured to irradiate with the light source light both (i) the radiation input face of the elongated luminescent body directly and (ii) another part of the one or more side faces indirectly via the cavity wall. As indicated above, the another part of the one or more side faces that are indirectly irradiated by the light source light effectively provide a further radiation input face. Here, the term "radiation input face" is especially reserved for the part of the one or more side faces, such as a side face, that is directly irradiated by the light sources. The term "further radiation input face" may be used for those part(s) of the one or more side faces that are indirectly irradiated. In specific embodiments, also further elucidated below, the radiation exit window has an angle (a) unequal to 0° and unequal to 180° with the radiation input face.

The light sources are especially configured in an array. The array may be regular or may be irregular, or may comprise a regular arrangement of irregularly arranged light sources, or an irregular arrangement of regularly arranged light sources. The light sources may share a single axis of elongation. However, in other embodiments one or more light sources may be off-axis of the axis of elongation.

With such system, light sources may be used, such as solid state light sources, having light emitting surfaces, like solid state light source dies, that extend beyond the (cross-sectional) width of the elongated luminescent body. This may be the case when the dies are broader than the width of the elongated luminescent body and/or this may be the case when a 2D array is applied. Hence, in embodiments the light source array has a light source array axis (AA), wherein the light sources in the light source array have a largest edge-to-edge width (WL2) perpendicular to the light source array axis (AA), wherein the edge-to-edge width (WL2) is larger than the width (W) of the elongated luminescent body and equal to or smaller than the slit opening width (WS1). When the light sources comprise solid state light sources that are essentially top emitters, especially WL2≥1.1*W. When the light sources comprise solid state light sources that have both side emission and top emission, WL2≥0.85*W. In specific embodiments, the light sources comprise essentially top emitting solid state light sources. In general, WL2≤2*W, such as WL2≤1.8*W, like especially WL2≤1.5*W, such as e.g. WL2≤1.3*W.

In general, the elongated slid may have cavity walls that are not straight with (also) a straight angle relative to a top or bottom, but may have cavity walls that are curved and/or slanted. In this way, a suitable cavity may be created wherein light source light after a reflection at the cavity wall enters the elongated luminescent body.

Hence, the elongated slit has a second slit width (WS2) at a slit end most remote from the slit opening, wherein the slit opening and the slit end are bridged by cavity wall parts, wherein the second slit width (WS2) at the slit end is smaller than the slit opening width (WS1). The slit end may be the bottom or top of the slit. Hence, especially the elongated luminescent body may be in thermal contact with the slit end. In embodiments the elongated luminescent body may have physical contact with the slit end. The slit end may be one of the slit side faces (see also below), or a part thereof.

In embodiments, WS1/WS2 is at least 1.1, such as at least 1.4, like at least 1.5. Especially, 1.1≤WS1/WS2≤5, like 1.3≤WS1/WS2≤5, such as 1.3≤WS1/WS≤3.

In embodiments, the height defined by the slit opening and the slit end may essentially be the same as the height of the elongated luminescent body. However, in other embodiments the height defined by the slit opening and the slit end may essentially be a bit larger, such as up to about 50%, like up to about 20%, larger than the height of the elongated luminescent body.

In specific embodiments, the cavity wall parts are straight and configured slanted, having a slant angle (β) relative to the elongated luminescent body selected from the range of 10-50°, like 15-50°, such as 15-45°, especially selected from the range of 20-40°. Relatively good (simulation) results were obtained with a slant angle (β) of about 30°.

In other embodiments, the cavity wall parts are curved, tapering in a direction from the slit opening to the slit end. For instance, in embodiments the cavity wall parts have the shape of a Bezier curve. The cavity wall part, that may especially be defined by the Bezier curve, may be defined by a first end, closest to the slit opening, and a second end, closest to the slit end. The second end may be relatively close to the elongated luminescent body. For instance, the second end may be in thermal contact, such as physical contact, with the elongated luminescent body. The cavity wall part, that may especially be defined by the Bezier curve, defines a concave cavity wall part. Hence, the cavity may have concave wall parts, like e.g. a bowl. Hence, the Bezier curve is curved. The first end and the second end of the Bezier curve define two corners of a rectangle, which can be divided in two triangles with a straight line between these triangles (or shared by these triangles), which is a diagonal of the rectangle. In one of the triangles, the Bezier curve will be found, as the Bezier curve is curved. The Bezier curve may further be defined by an intermediate point (which is not on the Bezier curve), which is defined within the triangle wherein the Bezier curve is found. The intermediate point may be chosen such, that incoupling is most efficient. Incoupling is not efficient when the intermediate point is not within one of the triangles (and only found in the triangle that allows a concave Bezier curve/concave wall part). The Bezier curve is especially a rational Bezier curve. The Bezier curve may be defined by:

$$B(t) = \frac{\sum_{i=0}^{n} \binom{n}{i} t^i (1-t)^{n-i} P_i w_i}{\sum_{i=0}^{n} \binom{n}{i} t^i (1-t)^{n-i} w_i}$$

Po is the first point, P2 is the second point, and P1 is the intermediate point. Especially, w0=w2=1. The value of w1 may be chosen from the range of about 0.4-1.5, especially at least 0.5, such as selected from the range of 0.5-1.2. P1 and w1 may be chosen such that light (source light) incoupling is most efficient (and thus the outcoupling via the radiation exit window is also largest). The value oft varies from 0 at the first point to 1 at the second point. Hence, t is a variable between 0-1 that defines all points on the Bezier curve. Curved shapes other than Bezier curves may also be possible. Further, optionally the cavity walls, or parts thereof, may be facetted, such that effectively a (virtually) curved cavity wall may be obtained. Hence, in embodiments a facetted cavity wall may also essentially follow a Bezier curve (though other curved shapes may also be possible).

The cavity wall parts comprise first parts that are configured conformal to part of the elongated luminescent body at first shortest distances (d11) selected from the range of ≤100 μm, wherein the first parts are configured closer to the slit end than to the slit opening. Alternatively or additionally, the cavity wall parts may (also) comprise second parts, configured closer to the slit opening than to the slit end, wherein the second parts taper in a direction from the slit opening to the first parts.

Combinations of such embodiments may also be possible, e.g. a part of a cavity edge that tapers in a flat way and a part of a cavity edge that tapers in a curved way.

The slit end is in thermal contact with the elongated luminescent body.

Further, in embodiments the slit opening width (WS1) and the width (W) of the elongated luminescent body have a ratio selected from the range of 1.1≤WS1/W≤5, like 1.3≤WS1/W≤5, such as 1.3≤WS1/W≤3. Too small or too large ratios may lead to light loss.

In embodiments, a feature in the herein proposed design(s) is (are) the simplicity of the rod holder in combination with one or more (simple) springs, holding the rod in the rod holder cavity. In this way, the rod and rod holder combination may in embodiments form a subassembly. This subassembly can be thermally connected to other parts, e.g. an own heat sink, or can be thermally coupled to another part e.g. the LED board, which than forms the thermal interface. Furthermore, a heat sink structure can be integrated into the rod holder to further increase thermal performance, whilst lowering part-count and thus cost. Furthermore, the rod inside the rod holder may be insulated from external forces, other than those imposed by the springs, which is highly advantageous when external heat sinks are being applied (most likely clamped) onto the complete module. With the present invention, it may also be possible to use cold forging and extrusion to produce e.g. the body holder structure, which may also have the right properties regarding reflectivity and thermal conductivity.

The plurality of light sources are configured to provide light source light. At least part of the light source light is absorbed by the luminescent body and converted into luminescent material light. To this end, the luminescent body comprises a radiation input face, wherein the radiation input face is configured in a light receiving relationship with the plurality of light sources. Hence, the light sources and the luminescent body are configured such that during operation at least part of the light source light enters the luminescent body (and is converted thereby). Further, as indicated above the elongated luminescent body comprises luminescent material configured to convert at least part of light source light (received at the radiation input face) into luminescent material light. The luminescent material light may escape from the luminescent body. Especially, for instance by using one or more reflectors at one or more sides and/or faces of the luminescent body, the luminescent material light may especially escape from the luminescent body at essentially one face. This face, here below also indicated as second face, may comprise a radiation exit window. In embodiments, the second face is the radiation exit window. Further, the elongated luminescent body comprises one or more side faces. The number of side faces is herein also indicated with reference N. The elongated luminescent body may especially comprise four side faces, providing a rectangular cross-section (perpendicular to an axis of elongated of the elongated body). The elongated luminescent body may in embodiments comprise a garnet type $A_3B_5O_{12}$ luminescent material comprising trivalent cerium. In specific embodiments, the length (L) of the elongated body may be selected from the range of 10-200 mm, such as selected from the range of 40-150 mm. Embodiments of the light sources and the elongated body are also further elucidated below.

The light sources are configured in an array. Such array may have a length in the same range as the length of the elongated body. The array may be a 1D array or a 2D array. In embodiments, the array is a 1D array, or an array of sets of two light sources. In order to maximize output, the light sources may have small distances to each other. Here, especially the inter-light source distance or inter-light source distance between adjacent light source along the length of the array is meant. When the array is a 2D array, the array may be an k1×k2 array, wherein k1>>k2. For instance, k2 may be 2-4, such as 2. The number k1 may e.g. be at least 5, such as at least 10. Especially, the elongated luminescent body and the light source array are configured parallel. The total number of light sources may be indicated as k, and may be at least 5, such as at least 10.

In embodiments, the plurality of k light sources may essentially be identical light sources. The k light sources may be essentially identical in terms of spectral power distribution and maximum power. The k light sources may further also be essentially identical in terms of dimensions (e.g. of the die). Hence, in embodiments the plurality of light sources may be selected from the same bin. However, in embodiments also different types of light sources may be used.

The luminescent material is configured to convert at least part of light source light (received at the radiation input face) into luminescent material light. Hence, the light source(s) generate the luminescent material light. In embodiments, the light sources that are used to generate the luminescent material light may be solid state light sources all of the same bin. In embodiments, the light sources that are used to generate the luminescent material light all have essentially the same peak maximum (peak emission wavelength). In embodiments, the light sources that are used to generate the luminescent material light may essentially all have the spectral power distribution and are all configured to generate essentially the same irradiance at the radiation input face.

Further, the light generating system comprises a body holder structure. The body holder structure comprises an elongated slit for hosting the elongated luminescent body. Hence, the luminescent body fits in the elongated slit. The body holder structure may comprise a body holder structure length. The slit may have a slit length. The slit length and body holder structure length may in embodiments be essentially the same, i.e. the slit is available over the entire length of the body holder structure. In other embodiments, the slit length may be shorter. In general, however, the slit extends to at least one of the edges of the body holder structure. The slit may be open at least one side. In this way, the elongate body can be provided in the slit in a direction perpendicular to an axis of elongated of the elongated body and the elongated slit. The one or more force applying elements, such as one or more spring elements, may keep the elongated luminescent body in the elongated slit. Essentially, in embodiments the slit may have a cross-sectional shape that has the same shape as the luminescent body (see however below for specific embodiments wherein the slit may have a cross-sectional shape that is not the same shape as the luminescent body). For instance, when the luminescent body has a hexagonal cross-sectional shape, the slit will have a shape wherein the hexagonal body fits with slit faces parallel to two or more, such as three, side faces of the luminescent body. Likewise, when for instance the luminescent body has a rectangular cross-section shape, the slit will have a shape wherein the rectangular body fits with slit faces parallel to two or more, such as three, side faces of the luminescent body. Hence, the elongated slit is especially configured for hosting the elongated luminescent body. Especially, however, the elongated slit has dimensions such that it does not provide an interference fit, but allows for some clearance. Hence, especially the width of the elongated slit may be larger than a width of the elongated luminescent body. Therefore, in embodiments the elongated slit and the elongated luminescent body have dimensions such that there is clearance between one or more of the one or more side faces and the elongated slit. In embodiments, the clearance may be in total selected from the range of 1-10 mm, such as selected from the range of 10 μm-2 mm, especially at maximum about 100 μm. Embodiments of the body holder structure, the slit, as well as the configuration of the elongated luminescent body in the slit, are also further elucidated below. As also indicated below, the clearance may vary over the height of the elongated luminescent body.

The system further comprises one or more force applying elements, such as one or more spring elements. Especially, the system comprises n force applying elements configured to keep the elongated body pushed against at least one of the one or more slit side faces of the elongated slit. In embodiments, the light generating system (thus) comprises n force applying elements configured to keep the elongated body in the elongated slit, wherein n is a natural number of at least 1. Especially, n is selected from the range of 2-4, more especially n is selected from the range of 2-3. In embodiments, the n force applying elements comprise n spring elements. The one or more spring elements may push the elongated body into the elongated slit. Hence, would e.g. the body holder structure be configured with the slit configured at the bottom, the luminescent body will not fall down, as the one or more spring elements keep the elongated body pushed into the elongated slit. Only part of the luminescent body may be in physical contact with the one or more spring elements, more specifically, only part of a side face and/or part of an end face (i.e. the first face, see below) will be in physical contact with the one or more spring elements. A single spring element may be in physical contact at one or more spatially separate positions with the luminescent body. Hence, in embodiments at least part of the one or more spring elements is in physical contact with the elongated body. The one or more spring elements may especially be configured to push the elongated luminescent body in a direction perpendicular to the axis of elongation thereof. In this way, the body may be kept in thermal contact with one or more side faces of the slit. Embodiments of the one or more spring elements are also further elucidated below. Other force applying elements may e.g. be selected from an element that via one or more screws presses, via intermediate means, the elongated body against one or more slit side faces. For instance, a vise-type construction maybe used to press the elongated body against one or more slit side faces.

A vise-type construction can provide a clamping effect by turning a screw-based mechanism with torque or moment of force, as known in the art.

In specific embodiments the elongated luminescent body comprises a first face and a second face defining a length (L) of the elongated luminescent body, wherein the second face comprises the radiation exit window, wherein the elongated luminescent body comprises a plurality of N side faces. In specific embodiments, N≥3. Especially, N=4 (such as especially a rectangular or (rectangular) square cross-section). Further, in specific embodiments the elongated slit may comprises N−1 slit side faces (or less than N−1, but at least two), wherein one or more of the (N−1 (or less than N−1, but at least two)) side faces are in thermal contact with one or more of the slit side faces.

For instance, assuming an elongated luminescent body having a rectangular cross-section, and the slit also having a rectangular cross-section, one or two side faces of the elongated luminescent body may be in thermal contact with one or two slit side faces, respectively. When the elongated luminescent body has a rectangular cross-section, especially four side faces are configured perpendicular to the first face.

Especially, only limited physical (or no) contact between the slit side faces and the face of the elongated luminescent body is desirable. By reducing the physical contact, optical radiation losses through evanescent waves may be minimized. Especially, the arrangement is such, that in general the distance between the face and the respective slit side face is large enough to prevent optical contact, such as at least 1 µm, like at least 2 µm (see also below), but small enough to have thermal contact, such as at maximum about 100 µm. This may be achieved by distance holders, using a rough or roughened surface, etc. (see also further below). Hence, in specific embodiments a side face in thermal contact with a slit side face is configured at a first average distance (d11) of at least 1 µm from the slid side face, like at least 2 µm, such as at least 10 µm, up to about 100 µm. Hence, in embodiments the average distance may be selected from the range of 1 µm≤d11≤100 µm, such as 1 µm≤d11≤50 µm, like about 2 µm≤d11≤20 µm. This may apply to each thermal contact between a side face of the elongated luminescent body and a side face of the slit, or other configurations of (other) items that are in thermal contact.

As indicated above, in embodiments one or two of the side faces are in thermal contact with two of the slit side faces. Especially for those side faces of the slit that are in thermal contact with the elongated luminescent body, it may be desirable that such slit side faces comprise a reflector. Hence, in embodiments such slit side face may be provided with a reflector (being reflective for especially the light source light, but especially also for the luminescent material light). Alternatively, or additionally, one or more slit side faces may have light reflective properties due to the fact that a light reflective material is applied for the body holder structure, or at least the part of the body holder structure that provides the slit. Hence, in embodiments one or more of the slit side faces being in thermal contact with one or more of the side faces comprises one or more reflectors being reflective for at least part of the light source light (and for at least part of the luminescent material light), and wherein at least a slit side face configured opposite of the light sources (with the elongated luminescent body configured between that slit side face and the light sources), comprises a reflector. Hence, especially the slit side face opposite of the plurality of light sources comprises such a reflector. As further explained below, this may also allow for reduction of the activator content in the elongated luminescent body, as light effectively has an optical path essentially twice as large as the situation without such reflector opposite of the light sources (with the elongated luminescent body in-between).

For achieving thermal contact and essentially no optical contact, the reflector may comprise elevations (to keep the elongated luminescent body at a distance from the (main part of the) reflector or distance holders may be used to configure the elongated luminescent body at a distance from the reflector.

As the slit hosts the elongated luminescent body, the one or more spring elements or other force applying elements may push the elongated body against the "top" side face and optionally also an "edge" side face. Irradiation with the light source light will especially be done via that part of the slit that is accessible (i.e. opposite of the "top" side face). Therefore, in embodiments the elongated luminescent body comprises a first side face and a second side face (defining a height (H)), wherein the one or more spring elements are in physical contact with part of the first side face, and wherein the second side face is in thermal contact with one of the slit side faces. Especially, the first side face comprises the radiation input face. Hence, in specific embodiments the light sources are configured to irradiate at least part of a single side face only, which may thus especially be the first side face. Due to an increase of temperature of the elongated luminescent body during operation of the system, the body may slightly bend. With the one or more spring elements, especially with at least two spatially different contact points with the elongated luminescent body, the spring elements may keep the elongated luminescent body in thermal contact with the slid side face(s). Hence, in embodiments the one or more spring elements may at least be configured to exert a force on the elongated luminescent body in a direction perpendicular to an axis of elongation of the luminescent body.

Especially, the light sources of the plurality of light sources are configured at a second shortest distance (d21) of at least 1 µm, such as at least 2 µm, like at least 10 µm from the radiation input face, such as even at least 100 µm. This prevents an optical contact with the elongated luminescent body, and when the second shortest distance is relatively long, also thermal contact may be low or absent (which allows the use of two thermally different pathways for the elongated luminescent body and the light sources, respectively). Also, optical in-coupling efficiency of the light originating from the light source(s) may be maximized by minimizing the second shortest distance (d21). Hence, in embodiments 10 µm≤d21≤100 µm.

When using this construction to keep the elongated luminescent body essentially fixed in the slit, only a small part (of especially one of the faces) of the body will be in contact with the spring element(s), leaving a relatively large part (of especially one of the faces) available for irradiation. Hence, loss of light due to optical contact between the elongated luminescent body and the one or more spring elements can be minimized in this way. A single spring element may have a single contact area with the elongated luminescent body. However, in other embodiments a single spring element may have a plurality of contact areas with the elongated luminescent body. Further, in embodiments a plurality of spring elements may be used. The contact area of the one or more spring elements is in general only a small part of the total area of the sides and edges, and especially only a small part of a single face or edge. As indicated above, the first side face may be a side face that is in physical contact with one or more spring elements. Especially, in embodiments the first side face has first area (A2), wherein the one or more spring elements are in physical contact with a contact area (Ac) of the first side face, wherein the contact area (Ac) is at maximum 20% of the first area (A2), such as at maximum 10%, like at maximum 5%, or even smaller, such as in the range of 0.1-4% of the first area. The non-contact area (of the first side face) may thus at minimum be 80%, such as at least 90%, like at least 95%, such as even at least 96%.

Only a limited number of contact areas may be necessary, such one, two, or three. For relatively long elongated luminescent bodies, e.g. 1 contact point per 1-5 cm may be applied. In specific embodiments, the one or more spring elements are configured in contact with the first side face at 1-4 positions distributed over the length (L) of the elongated luminescent body, such as only 2-3 contact point.

The elongated luminescent body may have a rectangular cross-section (perpendicular to the axis of elongation). However, other cross-sections, like triangular, or hexagonal, may also be possible. However, in general the plurality of N side faces are configured perpendicular to the first face. Further, in some embodiments the plurality of N side faces are also configured perpendicular to the second face.

For keeping the light in the elongated luminescent body and allowing as much light source light be converted, it may be useful to use reflectors (see also above). As the one or more spring elements are in physical contact with the elongated luminescent body, one or more of the one or more spring elements may use a reflector element to push against the elongated luminescent body. At the other end of the elongated luminescent body, or at a collimator, such as a CPC, the elongated luminescent body, or at a collimator, such as a CPC may be prevented to move (along the axis of elongation) by means of an end stop.

Furthermore, one may also provide a reflector at the first face (or end face) of the elongated luminescent body. As in embodiments it may also be useful to have (another) spring element push against the first face, such spring element may also include a reflector. Therefore, in embodiments the light generating system may further comprising a reflector configured to reflect light selected from the group of light source radiation and luminescent material radiation that has escaped from the first face back into the elongated luminescent body, wherein the reflector is comprised by one of the one or more spring elements. The spring element may comprise a spring, which is especially an elastic object that stores mechanical energy. Springs are typically made of spring steel, though other materials may also be possible. The spring element may include a flat spring. Alternatively, or additionally, the spring element may comprise a machined spring. Alternatively, or additionally, the spring element may comprise a serpentine spring. Alternatively, or additionally, the spring element may comprise a cantilever spring. Alternatively, or additionally, the spring element may comprise a coil spring or helical spring. In embodiments, the one or more spring elements may include a single wire spring, which may especially have one or more, even more especially, two or more, like 2-4 (i.e. two, three or four), contact areas with the elongated luminescent body (especially the first side face).

The body holder structure may comprise one or more heat transfer elements. Alternatively, or additionally, the body holder structure is thermally coupled to one or more heat transfer elements. In specific embodiments, the body holder structure is a monolithic body. The monolithic body may comprise a heat transfer element. Alternatively, or additionally, the monolithic body may be thermally coupled to one or more heat transfer elements. Especially, the one or more heat transfer elements are thermally coupled to the luminescent body. Hence, the one or more heat transfer elements may be configured for guiding away heat from the luminescent body. Examples of heat transfer elements are further described below.

For instance, in embodiments the body holder structure may include an aluminum body with the slit. This may provide good thermal (heat sinking) properties as well as the body may provide reflectance. The aluminum body may be coated to enhance reflectivity and/or improve durability.

As indicated above, it may be useful to decouple the thermal management of the light sources and of the elongated luminescent body. Hence, the light sources or their substrate(s) may be thermally coupled to other heat transfer elements than those mentioned above in relation to the body holder structure. Hence, in embodiments the light generating system may comprise one or more second heat transfer elements for guiding away heat from the plurality of light sources. These second heat transfer elements may be coupled to a substrate with one or more light sources. Hence, especially the light sources are thermally coupled to one or more (second) heat transfer elements.

Hence, in embodiments the one or more heat transfer elements and the one or more second heat transfer elements are thermally coupled. In alternative embodiments, the one or more heat transfer elements and the one or more second heat transfer elements are not thermally coupled. In this embodiment, the temperature and especially the thermal management of the light sources may be decoupled from the temperature and especially the thermal management of the elongated luminescent body. Hence, in embodiments one or more heat sinks may be thermally coupled (either directly or via a heat transfer element) to the elongated body and one or more other heat sinks may be thermally coupled (either directly or via a heat transfer element) to the light sources (wherein the one or more heat sinks and one or more other heat sinks are not thermally coupled (via a heat transfer element)).

Here below, some aspects of heat transfer elements are described. As indicated above, such heat transfer element may be comprised by the body holder structure or may be used to guide away heat from the light sources. Especially, embodiments are described in relation to guiding away heat from the elongated luminescent body. Further specific embodiments of the heat transfer element(s) are elucidated below.

In embodiments, one or more heat transfer elements are in thermal contact with one or more side faces and are especially configured to transfer heat away (from the luminescent body) during operation of the light generating system. Likewise, in embodiments, one or more heat transfer elements are in thermal contact with one or more light sources (or a substrate with one or more light sources) and are especially configured to transfer heat away during operation of the light generating system.

Therefore, the heat transfer element(s) may also be indicated as "cooling element(s)". Hence, in embodiments the heat transfer element(s) may be heatsinks or may be functionally coupled to heatsinks. Especially, the one or more heat transfer elements comprise a thermally conductive material, such as having a thermal conductivity of at least about 20 W/m/K, like at least about 30 W/m/K, such as at least about 100 W/m/K, like especially at least about 200 W/m/K. In embodiments, the thermally conductive material may comprise a metal, such as copper or aluminum. Alternatively or additionally, the thermally conductive material may comprise graphite or a ceramic material.

Especially, the one or more heat transfer elements are configured parallel to at least part of one or more of the side faces over at least part of the length (L) of the (elongated) luminescent body. Further, especially the one or more heat transfer elements are configured at a shortest distance (d11) from the respective one or more side faces with 1 µm≤d11≤100 µm. In this way, there may essentially no physical contact, which may lead to undesired outcoupling of the light source light and/or the luminescent material light, while there is a good thermal coupling. Especially, the shortest distance (d11) is selected from the range of 2 µm≤d11≤50 µm. Hence, when the shortest distance is at least 1 µm, there may essentially be no optical contact.

The one or more heat transfer elements may comprise one or more heat transfer element faces directed to one or more side faces. As indicated above, especially there is no physical contact. However, in embodiments there may be physical contact, but only part of a face of the luminescent body is in contact with part of the one or more heat transfer elements. Hence, in embodiments at least part of the one or more heat transfer element faces of the respective one or more heat transfer elements is in physical contact with the elongated luminescent body. Especially, in such embodiments the shortest distance (d11) is an average distance. Hence, in embodiments the one or more heat transfer elements are configured at an average shortest distance (d11) from the respective one or more side faces with 1 µm≤d11≤100 µm.

The one or more heat transfer elements may be configured as a monolithic heat transfer element. For instance, such monolithic heat transfer element may include a cavity, such as a slit, wherein the luminescent body may be configured. In this way, the monolithic heat transfer element may enclose N−1 side faces of the luminescent body. Hence, in embodiments the one or more heat transfer elements are at least in thermal contact with all side faces other than the first side face, and wherein the one or more heat transfer elements are configured as a monolithic heat transfer element. Optionally, part of the one or more heat transfer elements may also be in thermal contact with the first side face. Further, in specific embodiments the one or more heat transfer elements, such as especially the monolithic heat transfer element, may be configured in thermal contact with a support for the light source. In embodiments, this support may be thermally conductive, such as having a thermal conductivity as indicated above. The monolithic heat transfer element may also be indicated as integrated heat transfer unit. The term "monolithic heat transfer element" may also refer to a plurality of (different) monolithic heat transfer elements.

Further, the reflector is especially configured at the second side face (and other faces that are not the radiation input face) and configured to reflect light source light escaping from the elongated luminescent body via second face back into the elongated luminescent body. This reflected light may be converted light as well as light source light that is used to illuminate the radiation input face, but that remains unabsorbed during propagation through the luminescent body.

With such system, relative to some prior art systems the efficiency can be improved, thermal management may be better, and the system may (therefore) operate more reliably.

Above, and also below, the heat transfer elements are especially described in relation to the heat transfer of the elongated body. However, the above embodiments may in general also apply to heat transfer element in relation to the light sources (or a substrate with light sources).

An important issue of high lumen density (HLD) devises may be the cooling of the luminescent rod. In a configuration with two-sided illumination, and a rod with a rectangular cross-section, only two sides are available for this. In that case, the maximum performance is (to some extend) limited by thermal quenching effects that occur in the luminescent rod. In a configuration with single-sided illumination, three sides are available, enabling better cooling. Furthermore, by implementing single-sided illumination combined with the 3-sided cooling of the rod, a single cooling path can be implemented via the LED board. This means that there is thermal coupling between the rod-cooling means and the LED board/PCB cooling in such a way that all heat is being transferred (e.g. to an external heatsink) through the LED board. This means that no additional cooling path from the rod holder towards the "outside world" is needed. This enables a more compact building form factor of the HLD module, enabling easy implementation in volume-critical systems, which may operate at relatively low optical output powers.

On the other hand, in the case of high-power applications, single-sided pumped designs increase the possibility for dedicated luminescent rod cooling separate from the LED-cooling interface, thus e.g. enabling slim form-factor systems.

Another issue relates to the cerium concentration of the rod material. The concentration should be high enough to absorb the incident blue light. However, if it is too high, several detrimental effects may happen, like concentration quenching and reabsorption, all leading to a diminished output of green light and more heat generation.

One advantage of a low cerium concentration is that there is less chance of concentration quenching. At high concentration, cerium sites may be so close to each other that energy is transferred to other sites and has a larger chance to be converted to heat instead of green radiation. Also, temperature quenching (the decrease of green luminescence at higher temperature) in general is lower at low cerium concentration. Another advantage is that, at lower concentration, there is less chance of reabsorption. Part of the converted (green) light can be absorbed in the rod; part of this is emitted again but part is lost (because of a finite quantum efficiency and escape losses). So, at lower concentration, more (green) light can reach the rod 'nose'. A possible further advantage might be that at lower cerium concentration the local intensity of green light will be smaller. The advantage of this might be that there is less chance of (local) photo saturation caused by excited-state absorption (i.e. loss of green light by absorption in the cerium level reached by blue absorption). Also, if a lower cerium concentration can be implemented and blue light passes the rod twice, the heat generated in the rod during light conversion (Stokes-shift) is more evenly distributed over the total volume. This prevents the formation of localized "hot-spots" in the crystal, preventing local thermal quenching and thermal runaways, which otherwise might result in catastrophic quenching.

The amount if cerium (Ce) that can be incorporated is limited. If the target etendue needs to be decreased the rod size has to decrease. At some point the thickness/Ce concentration combination is such, that the rod is not thick enough to have full conversion of the blue pump light. As Ce concentration cannot be increased, this will lead to decreased performance, i.e. full conversion of the blue light cannot be reached. In single sided, this is solved by the reflecting walls, so smaller etendues are possible using the same Ce concentrations.

Finally, due to the improved cooling of the rod material, it is possible to increase the incident blue flux onto this material. It is thus possible to drive the blue pumping LEDs at a higher output level, or use LEDs that already have a higher output flux. By doing so, a higher output flux from the HLD module can be achieved, while the temperature of the converter rod can still be kept below its critical quenching temperature. Hence, a system is obtained that is less thermally critical and thus can be operated at higher output fluxes.

Especially, the light generating system comprises a light source configured to provide light source light. The light source is especially a solid state light source, such as a LED. The light source especially provides light source light having a peak maximum at or close to the excitation maximum of the luminescent material. Therefore, in embodiments wherein the luminescent material has an excitation maximum $\lambda_{xm}$, wherein the light sources are configured to provide the source light with an intensity maximum $\lambda_{px}$, wherein $\lambda_{xm}-10$ nm$\leq\lambda_{px}\leq\lambda_{xm}+10$ nm, especially wherein $\lambda_{xm}-5$ nm$\leq\lambda_{px}\leq\lambda_{xm}+5$ nm, such as wherein $\lambda_{xm}-2.5$ nm$\leq\lambda_{px}\leq\lambda_{xm}+2.5$ nm. Especially, the light source wavelength is at wavelengths with at least an (excitation) intensity of 50% of the excitation maximum (intensity), such as at least 75% of the excitation maximum (intensity), such as at least 90% of the excitation maximum (intensity) (of the excitation maximum of the luminescent material). Especially, the light source is configured with its optical axis perpendicular to the first side face, especially perpendicular the radiation input face (see further also below). Further, especially a plurality of light sources is applied. Hence, in specific embodiments the light sources have optical axes configured perpendicular to the first side face, especially perpendicular the radiation input face. Further, especially a single side face is illuminated with the light source light (when n=4).

Further embodiments of the light sources and their application are also elucidated below.

As indicated above, the light generating system especially comprises a luminescent body, especially an elongated luminescent body, having a length (L), the (elongated) luminescent body comprising (n) side faces over at least part of the length (L), wherein n≥3. Hence, especially the (elongated) luminescent body has a cross-sectional shape (perpendicular to an axis of elongation) that is square (n=4), rectangular (n=4), hexagonal (n=6), or octagonal (n=8), especially rectangular. Would the luminescent body have a circular cross-section, N may be considered ∞. The (elongated) body includes a first end or first face, in general configured perpendicular to one or more of the (n) side faces and a second end or second face, which may be configured perpendicular to one or more of the side faces, and thus parallel to the first face, but which also may be configured under an angle unequal to 90° and unequal to 180°. Hence, in embodiments in specific embodiments the radiation exit window has an angle unequal to 0° and unequal to 180° with one or more of the one or more side faces, especially all of the side faces. Note that the angle α may differ per for different side faces. For instance, a slanted radiation exit window of a bar shaped elongated body may have an angle of α1 with a first side face, an angle α2=180°−α1 with a second side face, and angles of 90° with the two other side faces.

The (elongated) luminescent body may thus in embodiments include (n) side faces, which comprise a first side face, comprising a radiation input face, and a second side face configured parallel to the first side face, wherein the side faces define a height (H). The first and the second side face are configured parallel with luminescent body material in between, thereby defining the width of the luminescent body. The radiation input face is at least part of the first face which may be configured to receive the light source light. The (elongated) luminescent body further comprises a radiation exit window bridging at least part of the height (H) between the first side face and the second side face. Especially, the radiation exit window is comprised by the second face. Further embodiments are also elucidated below. As indicated above, in embodiments the radiation exit window and the radiation input face have an angle (α) unequal to 0° and unequal to 180°. Yet further, as also indicated above in embodiments the radiation exit window has an angle unequal to 0° and unequal to 180° with one or more of the one or more side faces.

Yet further, the elongated luminescent body comprises a garnet type $A_3B_5O_{12}$ luminescent material comprising trivalent cerium ($Ce^{3+}$), with a height dependent concentration selected from a concentration range defined by a minimum concentration $y_{min}=0.036*h^{-1}$ and a maximum concentration $y_{max}=0.17*h^{-1}$, wherein y is the trivalent cerium concentration in % relative to the A element, and wherein h is the height in mm. Further, especially the height is selected from the range of 0.1-100 mm, such as 0.1-20 mm, like 0.1-10 mm, such as 0.5-2 mm. For instance, A may be yttrium. When e.g. the height is 1 mm, then h=1, as the height is in mm, leading to a possible concentration range which is 0.036-0.17%. Would however the height be 0.1 mm, then the concentration range from which the concentration can be selected is 0.36-1.7%. Would the concentration be indicated with y, then A can be replaced by $A_{1-x/100}Ce_{x/100}$. For instance, would x be 2.2 (see example), then this would result in $A_{0.978}Ce_{0.022}$.

In embodiments, A comprises one or more of yttrium, gadolinium and lutetium, and wherein B comprises one or more of aluminum and gallium. In embodiments, wherein A=Lu and wherein B=Al, or wherein A comprises Y and Lu, and wherein B=Al. The element A, as well as (further) embodiments of the garnet, are further elucidated below.

The garnet type $A_3B_5O_{12}$ luminescent material is configured to convert at least part of the light source light into converter light. Especially, the garnet material is a material that has an absorption band in the range of 400-500 nm, such as with a maximum in the range of 420-480 nm. Upon excitation with the light source light, the luminescent material generates emission, with one or more wavelengths selected from especially the range of 500-800 nm, as known in the art. Further embodiments are also elucidated below.

The light generating system may comprise an optical element, wherein the optical element comprises the luminescent body, and optionally other optical elements. The light generating system may also include a plurality of luminescent bodies, wherein one or more, especially all, luminescent bodies are as defined herein. The optical element may include one or more luminescent bodies. Further, the light generating system may include a plurality of optical elements. Further embodiments are elucidated below.

As indicated above, the light generating system further includes a reflector. Especially, such reflector may be configured to reflect light source light escaping from the elongated luminescent body via second face back into the elongated luminescent body. In specific embodiments, the reflector is (thus) especially configured at the second side face. As in embodiments at least part of the one or more heat transfer elements is configured in thermal contact with at least part of the second side face, such reflector may be configured between the one or more heat transfer elements or may be comprised by the one or more heat transfer elements.

The one or more heat transfer elements may include one or more (external) faces, which may be indicated as heat transfer element faces. Therefore, in embodiments a heat transfer element face of the one or more heat transfer element may be directed to the second face comprises the reflector. The reflector may comprise a specular mirror, such as an aluminum (coated) mirror. The reflector may also comprise a diffuse reflector, such as a coating of a metal oxide or other reflective material that is (highly) reflective, especially in the visible (spectral range). Hence, the reflective material may be a specular reflective material, such as an aluminum mirror. The reflective material may also be diffuse reflective material, such as a coating of a particulate white material. Suitable reflective material for reflection in the visible may be selected from the group consisting of $TiO_2$, $BaSO_4$, $MgO$, $Al_2O_3$, and Teflon. Especially, all heat transfer element face that are directed to the luminescent body comprise such reflector. When a heat transfer element face comprises a reflector, the shortest distance between the reflector and the luminescent body may be as defined herein (for the shortest distance between the heat transfer element (face) and the luminescent body).

In specific embodiments, the reflector and the heat transfer element may be the same element. The material of the heat transfer element can have good thermal conductance properties and a high optical reflectivity (>90%) in e.g. the visible spectral range. An example of such a material is AlSiMgMn.

As indicated above, the light generating system may comprise a plurality of light sources to provide light source light that is at least partly converted by the elongated luminescent body (herein also indicated as "light transmissive body"), more especially the luminescent material of the light transmissive body, into converter radiation. The converted light can at least partially escape form the radiation exit window, which is especially in optical contact with the optical element, more especially the radiation entrance window thereof.

The optical element may especially comprise a collimator used to convert (to "collimate") the light beam into a beam having a desired angular distribution. Further, the optical element especially comprises a light transmissive body comprising the radiation entrance window. Hence, the optical element may be a body of light transmissive material that is configured to collimate the converter radiation from the luminescent body. In specific embodiments, the optical element comprises a compound parabolic like collimator, such as a CPC (compound parabolic concentrator). A massive collimator, such as a massive CPC, may especially be used as extractor of light and to collimate the (emission) radiation. Alternatively, one may also comprise a dome with optical contact (n>1.00) on the nose of the rod or a hollow collimator, such as a CPC, to concentrate the (emission) radiation.

The optical element may have cross section (perpendicular to an optical axis) with a shape that is the same as the cross-section of the luminescent body (perpendicular to the longest body axis (which body axis is especially parallel to a radiation input face). For instance, would the latter have a rectangular cross section, the former may also have such rectangular cross section, though the dimension may be different. Further, the dimension of the optical element may vary over its length (as it may have a beam shaping function).

Further, the shape of the cross-section of the optical element may vary with position along the optical axis. In a specific configuration, the aspect ratio of a rectangular cross-section may change, preferably monotonically, with position along the optical axis. In another preferred configuration, the shape of the cross-section of the optical element may change from round to rectangular, or vice versa, with position along the optical axis.

As indicated above, the radiation exit window (of the elongated light transmissive body) may be in optical contact with the radiation entrance window of the optical element. The term "optical contact" and similar terms, such as "optically coupled" especially mean that the light (especially luminescent material light) escaping the radiation exit window surface area (A1) may enter the optical element radiation entrance window with minimal losses (such as Fresnel reflection losses or TIR (total internal reflection) losses) due to refractive index differences of these elements. The losses may be minimized by one or more of the following elements: a direct optical contact between the two optical elements, providing an optical glue between the two optical elements, preferably the optical glue having a refractive index higher that the lowest refractive index of the two individual optical elements, providing the two optical elements in close vicinity (e.g. at a distance much smaller than the wavelength of the light), such that the light will tunnel through the material present between the two optical elements, providing an optically transparent interface material between the two optical elements, preferably the optically transparent interface material having a refractive index higher that the lowest refractive index of the two individual optical elements, the optically transparent interface material might be a liquid or a gel or providing optical Anti Reflection coatings on the surfaces of (one or both of) the two individual optical elements. In embodiments, the optically transparent interface material may also be a solid material. Further, the optical interface material or glue especially may have a refractive index not higher than the highest refractive index of the two individual optical elements.

Instead of the term "in optical contact" also the terms "radiationally coupled" or "radiatively coupled" may be used. The term "radiationally coupled" especially means that the luminescent body (i.e. the elongated light transmissive body) and the optical element are associated with each other so that at least part of the radiation emitted by the luminescent body is received by the luminescent material. The luminescent body and the optical element, especially the indicated "windows" may in embodiments be in physical contact with each other or may in other embodiments be separated from each other with a (thin) layer of optical glue, e.g. having a thickness of less than about 1 mm, preferably less than 100 µm. When no optically transparent interface material is applied, the distance between two elements being in optical contact may especially be about at maximum the wavelength of relevance, such as the wavelength of an emission maximum. For visible wavelengths, this may be less than 1 µm, such as less than 0.7 µm, and for blue even smaller.

Likewise, the light sources are radiationally coupled with the luminescent body, though in general the light sources are not in physical contact with the luminescent body (see also below). As the luminescent body is a body and as in general also the optical element is a body, the term "window" herein may especially refer to side or a part of a side.

Hence, the luminescent body comprises one or more side faces, wherein the optical element is configured to receive at the radiation entrance window at least part of the converter radiation that escapes from the one or more side faces.

This radiation may reach the entrance window via a gas, such as air directly. Also the radiation may be delivered via another interface material such as a liquid or transparent solid interface material. Additionally or alternatively, this radiation may reach the entrance window after one or more reflections, such as reflections at a mirror positioned nearby the luminescent body. Hence, in embodiments the light generating system may further comprise a first reflective surface, especially configured parallel to one or more side faces, and configured at a first distance from the luminescent body, wherein the first reflective surface is configured to reflect at least part of the converter radiation that escapes from the one or more side faces back into the luminescent body or to the optical element. The space between the reflective surface and the one or more side faces may comprise a gas, wherein the gas comprises air. The first distance may e.g. be in the range of 0.1 µm-20 mm, such as in the range of 1 µm-10 mm, like 2 µm-10 mm.

Especially, the distance is at least equal to the wavelength of interest, more especially at least twice the wavelength of interest. Further, as there may be some contact, e.g. for holding purposes or for distance holder purposes, especially an average distance is at least j, such as at least $1.5*\lambda_i$, like at least $2*\lambda_i$, such as especially about $5*\lambda_i$, wherein $\lambda_i$ is the wavelength of interest. Especially, however, the average distance is in embodiments not larger than 50 µm, such as not larger than 25 µm, like not larger than 20 µm, like not larger than 10 µm, for purposes of good thermal contact. Likewise, such average minimum distance may apply to a reflector and/or optical filter configured at e.g. an end face, or other optical components as well. Optionally, in embodiments an element may comprise both heat sinking function a reflection function, such as a heat sink with a reflective surface, or a reflector functionally coupled to a heat sink.

The light generating system may be configured to provide blue, green, yellow, orange, or red light, etc. Alternatively or additionally, in embodiments, the light generating system may (also) be configured to provide one or more of UV, such as near UV (especially in the range of 320-400 nm), and IR, such as near IR (especially in the range of 750-3000 nm). Further, in specific embodiment, the light generating system may be configured to provide white light. If desired, monochromaticity may be improved using optical filter(s). The definitions of near UV and near infrared may partly overlap with the generally used definition for visible light, which is 380-780 nm.

The term "light concentrator" or "luminescent concentrator" is herein used, as one or more light sources irradiate a relatively large surface (area) of the light converter, and a lot of converter radiation may escape from a relatively small area (radiation exit window) of the light converter. Thereby, the specific configuration of the light converter provides its light concentrator properties. Especially, the light concentrator may provide Stokes-shifted light, which is Stokes shifted relative to the pump radiation. Hence, the term "luminescent concentrator" or "luminescent element" may refer to the same element, especially an elongated light transmissive body (comprising a luminescent material), wherein the term "concentrator" and similar terms may refer to the use in combination with one or more light sources and the term "element" may be used in combination with one or more, including a plurality, of light sources. When using a single light source, such light source may e.g. be a laser, especially a solid state laser (like a LED laser). The elongated light transmissive body comprises a luminescent material and can herein especially be used as luminescent concentrator. The elongated light transmissive body is herein also indicated as "luminescent body". Especially, a plurality of light sources may be applied.

The terms "upstream" and "downstream" relate to an arrangement of items or features relative to the propagation of the light from a light generating means (here the especially the light source(s)), wherein relative to a first position within a beam of light from the light generating means, a second position in the beam of light closer to the light generating means is "upstream", and a third position within the beam of light further away from the light generating means is "downstream".

The light concentrator comprises a light transmissive body. The light concentrator is especially described in relation to an elongated light transmissive body, such as a ceramic rod or a crystal, such as a single crystal. However, these aspects may also be relevant for other shaped ceramic bodies or single crystals. In specific embodiments, the luminescent body comprises a ceramic body or single crystal.

The light transmissive body has light guiding or wave guiding properties. Hence, the light transmissive body is herein also indicated as waveguide or light guide. As the light transmissive body is used as light concentrator, the light transmissive body is herein also indicated as light concentrator. The light transmissive body will in general have (some) transmission of one or more of (N)UV, visible and (N)IR radiation, such as in embodiments at least visible light, in a direction perpendicular to the length of the light transmissive body. Without the activator (dopant) such as trivalent cerium, the internal transmission in the visible might be close to 100%.

The transmission of the light transmissive body for one or more luminescence wavelengths may be at least 80%/cm, such as at least 90%/cm, even more especially at least 95%/cm, such as at least 98%/cm, such as at least 99%/cm. This implies that e.g. a 1 $cm^3$ cubic shaped piece of light transmissive body, under perpendicular irradiation of radiation having a selected luminescence wavelength (such as a wavelength corresponding to an emission maximum of the luminescence of the luminescent material of the light transmissive body), will have a transmission of at least 95%. Hence, the elongated luminescent body is herein also indicated "light transmissive body", as this body is light transmissive for the luminescent material light.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

In embodiments, an anti-reflection coating may be applied to the luminescent body, such as to suppress Fresnel reflection losses (during the light incoupling process).

In addition to a high transmission for the wavelength(s) of interest, also the scattering for the wavelength(s) may especially be low. Hence, the mean free path for the wavelength of interest only taking into account scattering effects (thus not taking into account possible absorption (which should be low anyhow in view of the high transmission), may be at least 0.5 times the length of the body, such as at least the length of the body, like at least twice the length of the body. For instance, in embodiments the mean free path only taking into account scattering effects may be at least 5 mm, such as at least 10 mm. The wavelength of interest may especially be the wavelength at maximum emission of the luminescence of the luminescent material. The term "mean free path" is especially the average distance a ray will travel before experiencing a scattering event that will change its propagation direction.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR.

Herein, the term "visible light" especially relates to light having a wavelength selected from the range of 380-780 nm. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The light transmissive body may have any shape, such as beam (or bar) like or rod like, however especially beam like (cuboid like). The light transmissive body, such as the luminescent concentrator, might be hollow, like a tube, or might be filled with another material, like a tube filled with water or a tube filled with another solid light transmissive medium. The invention is not limited to specific embodiments of shapes, neither is the invention limited to embodiments with a single exit window or outcoupling face. Below, some specific embodiments are described in more detail. Would the light transmissive body have a circular cross-section, then the width and height may be equal (and may be defined as diameter). Especially, however, the light transmissive body has a cuboid like shape, such as a bar like shape, and is further configured to provide a single exit window.

In a specific embodiment, the light transmissive body may especially have an aspect ratio larger than 1, i.e. the length is larger than the width. In general, the light transmissive body is a rod, or bar (beam), or a rectangular plate, though the light transmissive body does not necessarily have a square, rectangular or round cross-section. In general, the light source is configured to irradiate one (or more) of the longer faces (side edge), herein indicated as radiation input face, and radiation escapes from a face at a front (front edge), herein indicated as radiation exit window. The light source(s) may provide radiation to one or more side faces, and optionally an end face. Hence, there may be more than one radiation input face. The radiation exit window may especially have an angle unequal to 0° and unequal to 180° with the radiation input face, such as angle(s) of 90°. Further, in specific embodiments the radiation exit window (112) has an angle unequal to 0° and unequal to 180° with one or more of the one or more side faces (140), such as angle(s) of 90°.

Especially, in embodiments the solid state light source, or other light source, is not in (direct) physical contact with the light transmissive body.

Physical contact (between the light exit window(s) of the light source(s) and the light entrance window(s) of the light transmissive body/bodies) may lead to undesired outcoupling (from the light transmissive body) and thus a reduction in concentrator efficiency. Hence, especially there is substantially no physical contact. If the actual contact area is kept small enough, the optical impact may be negligible or at least acceptable. Therefore, it may be perfectly acceptable to have some physical contact, e.g. by some small points as resulting from a certain surface roughness, or non-perfectly flat surface, or by some intentionally created "highest spots" on a surface that will define a certain average distance between the two surfaces that don't extract substantial amounts of light while enabling a short average distance.

Further, in general the light transmissive body comprises two substantially parallel faces, a radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has an radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive, digital projectors, or high brightness spotlight applications, a small but high radiant flux or luminous flux emissive surface is desired. This cannot be obtained with a single LED, but can be obtained with the present light generating system. Especially, the radiation exit window has a radiation exit window area (E) selected from the range of 1-100 mm$^2$. With such dimensions, the emissive surface can be small, whereas nevertheless high radiance or luminance may be achieved. As indicated above, the light transmissive body in general has an aspect ratio (of length/width). This allows a small radiation exit surface, but a large radiation input surface, e.g. irradiated with a plurality of solid-state light sources.

Hence, the light transmissive body is especially elongated. Therefore, the length of the light transmissive body is in embodiments larger than the cross-sectional diameter or of the equivalent circular cross-sectional diameter. Here, "cross-sectional" refers to a cross-section perpendicular to the axis or length of elongation of the light transmissive body. The equivalent circular diameter (or ECD) of an (irregularly shaped) two-dimensional shape (such as a cross-section) is the diameter of a circle of equivalent area. For instance, the equivalent circular diameter of a square with side a is $2*a*SQRT(1/\pi)$.

In a specific embodiment, the light transmissive body has a height (H) selected from the range of 0.5-100 mm, such as 0.5-10 mm. However, smaller heights may also be possible, such as about 100-500 µm, like at least 140 µm. The light transmissive body is thus especially an integral body, having the herein indicated faces.

The generally rod shaped or bar shaped light transmissive body can have any cross-sectional shape, but in embodiments has a cross section the shape of a square, rectangle, round, oval, triangle, pentagon, or hexagon. Generally, the ceramic or crystal bodies are cuboid. In specific embodiments, the body may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a light transmissive body having a round cross section. Hence, in embodiments the elongated light transmissive body further has a height (H), with especially L>W and L>H. Especially, the first face and the second face define the length, i.e. the distance between these faces is the length of the elongated light transmissive body. These faces may especially be arranged parallel. Further, in a specific embodiment the length (L) is at least 2 cm, like 3-20 cm, such as 4-20 cm, such as at maximum 15 cm. Other dimensions may, however, also be possible, such as e.g. 0.5-2 cm.

Especially, the light transmissive body has a height (H) selected to absorb more than 95% of the light source light. In embodiments, the light transmissive body has a height (H) selected from the range of 0.03-4 cm, especially 0.05-2 cm, such as 0.1-1.5 cm, like 0.1-1 cm. With the herein indicated cerium concentration, such width is enough to absorb substantially all light (especially at the excitation wavelength with maximum excitation intensity) generated by the light sources.

The light transmissive body may also be a cylindrically shaped rod. In embodiments the cylindrically shaped rod has one flattened surface along the longitudinal direction of the rod and at which the light sources may be positioned for efficient incoupling of light emitted by the light sources into the light transmissive body. The flattened surface may also be used for placing heatsinks. The cylindrical light transmissive body may also have two flattened surfaces, for example located opposite to each other or positioned perpendicular to each other. In embodiments the flattened surface extends along a part of the longitudinal direction of the cylindrical rod. Especially however, the edges are planar and configured perpendicular to each other.

The side face is especially such flattened surface(s). The flattened surface especially has a relatively low surface roughness, such as an Ra of at maximum 100 nm, such as in the range of 5-100 nm, like up to 50 nm.

The light transmissive body may also comprise a tube or a plurality of tubes. In embodiments, the tube (or tubes) may be filled with a gas, like air or another gas having higher heat conductivity, such as helium or hydrogen, or a gas comprising two or more of helium, hydrogen, nitrogen, oxygen and carbon dioxide. In embodiments, the tube (or tubes) may be filled with a liquid, such as water or (another) cooling liquid.

The light transmissive body as set forth below in embodiments according to the invention may also be folded, bended and/or shaped in the length direction such that the light transmissive body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light transmissive body of which the total length, along which generally the light is guided, is relatively large, leading to a relatively high lumen output, but can at the same time be arranged into a relatively small space. For example, luminescent parts of the light transmissive body may be rigid while transparent parts of the light transmissive body are flexible to provide for the shaping of the light transmissive body along its length direction. The light sources may be placed anywhere along the length of the folded, bended and/or shaped light transmissive body.

Parts of the light transmissive body that are not used as light incoupling area or light exit window may be provided with a reflector. Hence, in an embodiment the light generating system further comprises a reflector configured to reflect luminescent material radiation back into the light transmissive body. Therefore, the light generating system may further include one or more reflectors, especially configured to reflect radiation back into the light transmissive body that escapes from one or more other faces than the radiation exit window. Especially, a face opposite of the radiation exit window may include such reflector, though in an embodiment not in physical contact therewith. Hence, the reflectors may especially not be in physical contact with the light transmissive body. Therefore, in an embodiment the light generating system further comprises an optical reflector (at least) configured downstream of the first face and configured to reflect light back into the elongated light transmissive body. Alternatively, or additionally, optical reflectors may also be arranged at other faces and/or parts of faces that are not used to couple light source light in or luminescence light out. Especially, such optical reflectors may not be in physical contact with the light transmissive body. Further, such optical reflector(s) may be configured to reflect one or more of the luminescence and light source light back into the light transmissive body. Hence, substantially all light source light may be reserved for conversion by the luminescent material (i.e. the activator element(s) such as especially Ce') and a substantial part of the luminescence may be reserved for outcoupling from the radiation exit window. The term "reflector" may also refer to a plurality of reflectors.

The one or more reflectors may consist of a metal reflector, such as a thin metal plate or a reflective metal layer deposited on a substrate, such as e.g. glass. The one or more reflectors may consist of an optical transparent body containing optical structure to reflect (part) of the light such as prismatic structures. The one or more reflectors may consist of specular reflectors. The one or more reflectors may contain microstructures, such as prism structures or saw tooth structures, designed to reflect the light rays towards a desired direction.

Preferably, such reflectors are also present in the plane where the light sources are positioned, such that that plane consist of a mirror having openings, each opening having the same size as a corresponding light source allowing the light of that corresponding light source to pass the mirror layer and enter the elongated (first) light transmissive body while light that traverses from the (first) light transmissive body in the direction of that plane receives a high probability to hit the mirror layer and will be reflected by that mirror layer back towards the (first) light transmissive body.

The terms "coupling in" and similar terms and "coupling out" and similar terms indicate that light changes from medium (external from the light transmissive body into the light transmissive body, and vice versa, respectively). In general, the light exit window will be a face (or a part of a face), configured (substantially) perpendicular to one or more other faces of the waveguide. In general, the light transmissive body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

For further improving efficiency and/or for improving the spectral distribution several optical elements may be included like mirrors, optical filters, additional optics, etc.

In specific embodiments, the light generating system may have a mirror configured at the first face configured to reflect light back into the elongated light transmissive body, and/or may have one or more of an optical filter, a (wavelength selective) mirror, a reflective polarizer, light extraction structures, and a collimator configured at the second face. At the second face the mirror may e.g. be a wavelength selective mirror or a mirror including a hole. In the latter embodiment, light may be reflected back into the body but part of the light may escape via the hole. Especially, in embodiments the optical element may be configured at a distance of about 0.01-1 mm, such as 0.1-1 mm from the body. This may especially apply for e.g. mirrors, wherein optical coupling is not desired.

When optical coupling is desired, such as with an optical element, like a CPC or a mixing element, downstream of the (part of the) body where the luminescent material is located, an optically transparent interface material may be applied. In yet other embodiments, when no optically transparent interface material is applied, the average distance between two elements being in optical contact may especially be about at maximum the wavelength of relevance, such as the wavelength of an emission maximum. Hence, when optical contact is desired, there may be physical contact. Even in such embodiments, there may be a non-zero average distance, but then equal to or lower than the wavelength of interest.

In specific embodiments, especially when no optical contact is desired, the average distance may be as indicated above but at a few places, for instance for configuration purposes, there may be physical contact. For instance, there may be contact with the edge faces over less than 10%, such as over less than 5% of the total area of the side faces. Hence, the minimum average distance may be as defined e.g. above and if there is physical contact, this physical contact may be with at maximum 10% of the surface area of the surface with which the element (mirror and/or heat sink) is in physical contact, such as at maximum 5%, like at maximum 2%, even more especially at maximum 1%. For instance, for the side faces an average distance may e.g. be between 2 and 10 µm (the lower limit basically determined as being a few times the wavelength of interest; here, assuming e.g. visible light). This may be achieved by having physical contact (to secure that distance) over less than 1% of the total area of that respective side face.

For instance, a heat sink or a reflector, or the relevant surface may have some protrusions, like a surface roughness, by which there may be contact between the surface and the element, but in average the distance is at least $\lambda_i$ (or more, see also above)(in order to essentially prevent optical contact), but there is physical contact with equal to or less than 10% of the surface of the body (to which the element may be thermally coupled and/or optically not coupled), especially substantially less.

In embodiments, optical elements may be included at one or more of the side faces. In particular, anti-reflection coatings may be applied to enhance coupling efficiency of the (excitation) light source light and/or (wavelength selective) reflection coatings for the converted light.

Downstream of the radiation exit window, optionally an optical filter may be arranged. Such optical filter may be used to remove undesired radiation. For instance, when the light generating system should provide red light, all light other than red may be removed. Hence, in a further embodiment the light generating system further comprises an optical filter configured downstream of the radiation exit window and configured to reduce the relative contribution of undesired light in the converter radiation (downstream of the radiation exit window). For filtering out light source light, optionally an interference filter may be applied.

In yet a further embodiment, the light generating system further comprises a collimator configured downstream of the radiation exit window (of the highest order luminescent concentrator) and configured to collimate the converter radiation. Such collimator, like e.g. a CPC (compound parabolic concentrator), may be used to collimate the light escaping from the radiation exit window and to provide a collimated or pre-collimated beam of light. Herein, the terms "collimated", "precollimated" and similar terms may especially refer to a light beam having a solid angle (substantially) smaller than 2n.

As indicated above, the light generating system may comprise a plurality of light sources. These pluralities of light sources may be configured to provide light source light to a single side or face or to a plurality of faces; see further also below. When providing light to a plurality of faces, in general each face will receive light of a plurality of light sources (a subset of the plurality of light sources). Hence, in embodiments a plurality of light sources will be configured to provide light source light to a radiation input face. Also, this plurality of light sources will in general be configured in a row or a plurality of rows. Hence, the light transmissive body is elongated, the plurality of light sources may be configured in a row, which may be substantially parallel to the axis of elongated of the light transmissive body. The row of light sources may have substantially the same length as the elongated light transmissive body. Hence, in the light transmissive body has a length (L) in the range of about 80-120% of the second length of the row of light sources; or the row of light sources has a length in the range of about 80-120% of the length of the light transmissive body.

The light sources may be configured to provide light with a wavelength selected from the range of UV (including near UV), visible, and infrared (including near IR).

Especially, the light sources are light sources that during operation emit (light source light) at least light at a wavelength selected from the range of 200-490 nm, especially light sources that during operation emit at least light at wavelength selected from the range of 360-490 nm, such as 400-490 nm, even more especially in the range of 430-490 nm, such as 440-490 nm, such as at maximum 480 nm. This light may partially be used by the luminescent material. Hence, in a specific embodiment, the light source is configured to generate blue light. In a specific embodiment, the light source comprises a solid state light source (such as a LED or laser diode). The term "light source" may also relate to a plurality of light sources, such as e.g. 2-2000, such as 2-500, like 2-100, e.g. at least 4 light sources, such as in embodiments especially 4-80 (solid state) light sources, though many more light sources may be applied. Hence, in embodiments 4-500 light sources may be applied, like e.g.

8-200 light sources, such as at least 10 light sources, or even at least 50 light sources. The term "light source" may also relate to one or more light sources that are tailored to be applied for such light concentrating luminescent concentrators, e.g. one or more LEDs having a long elongated radiating surface matching the long elongated light input surfaces of the elongated luminescent concentrator. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light transmissive body. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB ("printed circuit board") or comparable. Hence, a plurality of semiconductor light sources may be configured on the same substrate. In embodiments, a COB is a multi LED chip configured together as a single lighting module.

The light generating system comprises a plurality of light sources. Especially, the light source light of the plurality of light sources have spectral overlap, even more especially, they are of the same type and provide substantial identical light (having thus substantial the same spectral distribution). Hence, the light sources may substantially have the same emission maximum ("peak emission maximum"), such as within a bandwidth of 10 nm, especially within 8 nm, such as within 5 nm (e.g. obtained by binning). However, in yet other embodiments, the light generating system may comprise a single light source, especially a solid-state light source having a relatively large die. Hence, herein also the phrase "one or more light sources" may be applied.

In embodiments, there may be two or more different luminescent materials, such as e.g. when applying two or more different light transmissive bodies. In such embodiments, the light sources may comprise light sources with two or more different emission spectra enabling excitation of two different luminescent materials. Such two or more different light sources may belong to different bins.

The light sources are especially configured to provide a blue optical power ($W_{opt}$) of at least 0.2 Watt/mm$^2$ to the light transmissive body, i.e. to the radiation input face(s). The blue optical power is defined as the energy that is within the energy range that is defined as blue part of the spectrum (see also below). Especially, the photon flux is in average at least $4.5*10^{17}$ photons/(s·mm$^2$), such as at least $6.0*10^{17}$ photons/(s·mm$^2$). Assuming blue (excitation) light, this may e.g. correspond to a blue power ($W_{opt}$) provided to at least one of the radiation input faces of in average at least 0.067 Watt/mm$^2$ and 0.2 Watt/mm$^2$, respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source light is applied) is also an average over time.

In yet a further embodiment, especially for (DLP (digital light processing)) projector applications, the plurality of light sources are operated in pulsed operation with a duty cycle selected from the range of 10-80%, such as 25-70%. In yet a further embodiment, especially for (LCD or DLP) projector applications using dynamic contrast technologies, such as e.g. described in WO0119092 or USRE42428 (E1), the plurality of light sources are operated in video signal content controlled PWM pulsed operation with a duty cycle selected from the range of 0.01-80%, such as 0.1-70%. In yet a further embodiment, especially for (LCD or DLP) projector applications using dynamic contrast technologies, such as e.g. described in US patent WO0119092 or U.S. Pat. No. 6,631,995 (B2), the plurality of light sources are operated in video signal content controlled intensity modulated operation with intensity variations selected from the range of 0.1-100%, such as 2-100%.

The light generating system may comprise a plurality of luminescent concentrators, such as in the range of 2-50, like 2-20 light concentrators (which may e.g. be stacked).

The light concentrator may radiationally be coupled with one or more light sources, especially a plurality of light sources, such as 2-1000, like 2-50 light sources. As can be derived from the above, at total number of light sources k may especially be at least 5. The term "radiationally coupled" especially means that the light source and the light concentrator are associated with each other so that at least part of the radiation emitted by the light source is received by the light concentrator (and at least partly converted into luminescence). Instead of the term "luminescence" also the terms "emission" or "emission radiation" may be applied.

Hence, the luminescent concentrator receives at one or more radiation input faces radiation (pump radiation) from an upstream configured light concentrator or from upstream configured light sources. Further, the light concentrator comprises a luminescent material configured to convert at least part of a pump radiation received at one or more radiation input faces into luminescent material radiation, and the luminescent concentrator configured to couple at least part of the luminescent material radiation out at the radiation exit window as converter radiation. This converter radiation is especially used as component of the light generating system light.

The phrase "configured to provide luminescent material radiation at the radiation exit window" and similar phrases especially refers to embodiments wherein the luminescent material radiation is generated within the luminescent concentrator (i.e. within the light transmissive body), and part of the luminescent material radiation will reach the radiation exit window and escape from the luminescent concentrator. Hence, downstream of the radiation exit window the luminescent material radiation is provided. The converter radiation, downstream of the radiation exit window comprises at least the luminescent material radiation escaped via the radiation exit window from the light converter. Instead of the term "converter radiation" also the term "light concentrator light" may be used. Pump radiation can be applied to a single radiation input face or a plurality of radiation input faces.

In embodiments, the length (L) is selected from the range of 1-100 cm, such as especially 2-50 cm, like at least 3 cm, such as 5-50 cm, like at maximum 30 cm. This may thus apply to all luminescent concentrators. However, the range indicates that the different luminescent concentrators may have different lengths within this range.

In yet further embodiments, the elongated light transmissive body (of the luminescent concentrator) comprises an elongated ceramic body. For instance, luminescent ceramic garnets doped with Ce' (trivalent cerium) can be used to convert blue light into light with a longer wavelength, e.g. within the green to red wavelength region, such as in the range of about 500-750 nm, or even in the cyan. To obtain sufficient absorption and light output in desired directions, it is advantageous to use transparent rods (especially substantially shaped as beams). Such rod can be used as light concentrator, converting light source light into converter radiation and providing at an exit surface (a substantial amount of) (concentrated) converter radiation. Light generating systems based on light concentrators may e.g. be of interest for projector applications. For projectors, red, yellow, green and blue luminescent concentrators are of interest. Green and/or yellow luminescent rods, based on garnets, can be relatively efficient. Such concentrators are especially based on YAG:Ce (i.e. $Y_3Al_5O_{12}:Ce^{3+}$) or LuAG, which can be indicated as $(Y_{1-x}Lu_x)_3Al_5O_{12}:Ce^{3+}$, where $0 \leq x \leq 1$, such as in embodiments $Lu_3Al_5O_{12}:Ce^{3+}$. 'Red' garnets can be made by doping a YAG-garnet with Gd ("YGdAG"). Cyan emitters can be made by e.g. replacing (part of the) Al (in e.g. LuAG) by Ga (to provide "LuGaAG"). Blue luminescent concentrators can be based on YSO ($Y_2SiO_5:Ce^{3+}$) or similar compounds or BAM ($BaMgAl_{10}O_{17}:Eu^{2+}$) or similar compounds, especially configured as single crystal(s). The term similar compounds especially refer to compounds having the same crystallographic structure but where one or more cations are at least partially replaced with another cation (e.g. Y replacing with Lu and/or Gd, or Ba replacing with Sr). Optionally, also anions may be at least partially replaced, or cation-anion combinations, such as replacing at least part of the Al—O with Si—N.

Hence, especially the elongated light transmissive body comprises a ceramic material configured to wavelength convert at least part of the (blue) light source light into converter radiation in e.g. one or more of the green, yellow and red, which converter radiation at least partly escapes from the radiation exit window.

In embodiments, the ceramic material especially comprises an $A_3B_5O_{12}:Ce^{3+}$ ceramic material ("ceramic garnet"), wherein A comprises yttrium (Y) and/or lutetium (Lu) and/or gadolinium (Gd), and wherein B comprises aluminum (Al) and/or gallium (Ga), especially at least Al. As further indicated below, A may also refer to other rare earth elements and B may include Al only, but may optionally also include gallium. The formula $A_3B_5O_{12}:Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

As indicated above, in embodiments the ceramic material comprises a garnet material. However, also other (crystallographic) cubic systems may be applied. Hence, the elongated body especially comprises a luminescent ceramic. The garnet material, especially the ceramic garnet material, is herein also indicated as "luminescent material". The luminescent material comprises an $A_3B_5O_{12}:Ce^{3+}$ (garnet material), wherein A is especially selected from the group consisting of Sc, Y, Tb, Gd, and Lu (especially at least Y and/or Lu, and optionally Gd), wherein B is especially selected from the group consisting of Al and Ga (especially at least Al). More especially, A (essentially) comprises (i) lutetium (Lu), (ii) yttrium, (iii) yttrium (Y) and lutetium (Lu), (iv) gadolinium (Gd), optionally in combination with one of the aforementioned, and B comprises aluminum (Al) or gallium (Ga) or a combination of both. Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}:Ce^{3+}$ especially refers to $(Y_{1-x}Gd_x)_3B_5O_{12}:Ce^{3+}$, wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}:Ce^{3+}$ especially refers to $(Y_{1-x}Gd_x)_3Al_5O_{12}:Ce^{3+}$, wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}:Ce^{3+}$ may also be defined as $(A_{1-n}Ce_n)_3B_5O_{12}$, with n being in the range of 0.001-0.036, such as 0.0015-0.01. Therefore, a garnet essentially comprising Y and mole Ce may in fact refer to $((Y_{1-x}Gd_x)_{1-n}Ce_n)_3B_5O_{12}$, with x and n as defined above.

Especially, the ceramic material is obtainable by a sintering process and/or a hot-pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

The luminescent concentrator may also be a crystal, such as a single crystal. Such crystals can be grown/drawn from the melt in a higher temperature process. The large crystal, typically referred to as boule, can be cut into pieces to form the light transmissive bodies. The polycrystalline garnets mentioned above are examples of materials that can alternatively also be grown in single crystalline form.

After obtaining the light transmissive body, the body may be polished. Before or after polishing an annealing process (in an oxidative atmosphere) may be executed, especially before polishing. In a further specific embodiment, the annealing process lasts for at least 2 hours, such as at least 2 hours at least 1200° C. Further, especially the oxidizing atmosphere comprises for example 02.

In specific embodiments, the luminescent concentrator may also be another material with light conversion properties such as e.g. quantum dots in glass, nanophosphors in transparent media etc.

The light generating system may further comprise a cooling element in thermal contact with the luminescent concentrator. The cooling element can be a heatsink or an actively cooled element, such as a Peltier element. Further, the cooling element can be in thermal contact with the light transmissive body via other means, including heat transfer via air or with an intermediate element that can transfer heat, such as a thermal grease. Especially, however, the cooling element is in physical contact with the light transmissive body. The term "cooling element" may also refer to a plurality of (different) cooling elements.

Hence, the light generating system may include a heatsink configured to facilitate cooling of the solid state light source and/or luminescent concentrator. The heatsink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. Alternatively, or additionally, the heatsink may comprise or consist of aluminum oxide. The term "heatsink" may also refer to a plurality of (different) heatsink. The light generating system may further include one or more cooling elements configured to cool the light transmissive body. With the present invention, cooling elements or heatsinks may be used to cool the light transmissive body and the same or different cooling elements or heatsinks may be used to cool the light sources. The cooling elements or heatsinks may also provide interfaces to further cooling means or allow cooling transport to dissipate the heat to the ambient. For instance, the cooling elements or heatsinks may be connected to heat pipes or a water-cooling systems that are connect to more remotely placed heatsinks or may be directly cooled by air flows such as generated by fans. Both passive and active cooling may be applied.

In specific embodiments, there is no physical contact between the heat sink (or cooling elements) and the light transmissive body. Especially, the average distance is at least the intensity averaged wavelength of light that is transmitted by luminescence of luminescent material. In embodiments, the average distance between the light transmissive body and the heatsink or cooling element is at least 1 µm, such as at least 2 µm, like at least 5 µm. Further, for a good heat transfer the average distance between the light transmissive body and the heatsink or cooling elements is not larger than 50 µm, such as not larger than 25 µm, like not larger than 20 µm, such as equal to or smaller than 15 µm, like at maximum 10 µm.

Therefore, in embodiments the light generating system may further comprise a heat sink having an average distance to the elongated light transmissive body of at least 1 µm, such as at least 2 µm, like especially at least 5 µm, or wherein the heat dissipating element is in physical contact with at maximum 10%, such as at maximum 5% of a total area of the side face(s) of the elongated light transmissive body. The average is thus especially not larger than 50 µm. Instead of the term "heat sink" also the term cooling element may be applied.

The term "heat dissipating element", and similar terms, herein refer to an element that dissipates the heat from the elongated luminescent body (and/or of the light sources) away from the elongated luminescent body (and/or of the light sources). To this end, the heat dissipating element comprises especially a (highly) thermally conductive material and may comprise or may be thermally coupled to a heat sink. In general, the heat dissipating element is a passive element, that does not generate thermal energy, but guides thermal energy away from the elongated luminescent body (and/or of the light sources). Instead of the term "heat dissipating element" also the term "heat transfer elements" may be applied.

As indicated above, especially there is an average distance between the elongated luminescent body and the slit side(s). As there are (substantial) parts, or the entire part, of the relevant face of the elongated body, at a distance between the (adjacent) slit face, there may be an air gap in between.

The thickness of the air gap is higher than the wavelength of the light, e.g. higher than 0.1 µm, e.g. higher 0.5 µm, like at least 1 µm, such as at least 2 µm. The elongated luminescent concentrator is secured in the housing by providing small particles between the elongated luminescent concentrator and the housing, such as small spheres or rods having a diameter higher than 0.1 µm, e.g. higher 0.5 µm, like at least 1 µm, such as at least 2 µm, such as at least 5 µm, especially equal to or smaller than 20 µm, such as equal to or smaller than 10 µm (see also above defined average). Alternatively, the elongated luminescent concentrator may be secured in the housing by providing some surface roughness on the surfaces of the highly thermal conductive housing touching the elongated luminescent concentrator, the surface roughness varying over a depth higher than 0.1 µm, e.g. higher 0.5 µm, like at least 1 µm, such as at least 2 µm, especially not larger than 100 µm, even more especially not larger than 50 µm, like not larger than 20 µm, especially equal to or smaller than about 5 µm. In embodiments, the root mean square height Sq may be selected from the range of 1-5 µm, such as 1-3 µm. In yet other embodiments, a face directed to the body holder structure may be configured at a distance selected from the range of 1-10 µm, such as 1-5 µm, like 1-3 µm with distance holders. The contact area Ac' of the distance holders with the face may be at maximum 20% of the second area A2' which may be defined as the total area of the part of the face directed to (a face of) the body holder structure, such as at maximum 10%, like at maximum 5%, or even smaller, such as in the range of 0.1-4% of the second area A2'.

The density of such spheres, rods or touch points of a rough surface of the highly thermal conductive housing is relatively very small, such that most of the surface area of the elongated light transmissive body remains untouched securing a high level of TIR reflections within of the light trapped within the elongated light transmissive body.

The light generating system may thus essentially consist of the elongated light transmissive body comprising a luminescent material and one or more, especially a plurality of light sources, which pump the luminescent material to provide luminescent material light, that escapes from a radiation exit window (of an end face (second face)).

Further, the light generating system may comprise an optical element, such as a CPC or (other) extraction optical element, which may be configured downstream of the light transmissive body, but which in embodiments may be integrated with the light transmissive body.

Optionally, between this optical element and the light transmissive body, a radiation mixing element may be configured. Hence, a section of the light transmissive body of an additional element may be configured that acts as an optical mixing rod (preferably not round, but e.g. hexagonal) between the converters and the CPC (or extraction optical element). Alternatively or additionally, the extraction optical element is designed such that it also mixes the light.

Further, the light generating system may comprise one or more holding elements for holding the light transmissive body. Especially, these holding elements have contact with the edge faces, but only with a small part thereof to minimize losses of light. For instance, the holding element(s), like clamping device (s) have contact with the edge faces over less than 10%, such as over less than 5% of the total area of the side faces. Further, the light generating system may comprise a heat sink and/or a cooling element. The holding element(s) may be comprised by the heat sink and/or cooling element.

The light generating system may be part of or may be applied in e.g. office light generating systems, household application systems, shop light generating systems, home light generating systems, accent light generating systems, spot light generating systems, theater light generating systems, architectural lighting, fiber-optics application systems, projection systems, self-lit display systems, pixelated display systems, segmented display systems, warning sign systems, medical lighting application systems, indicator sign systems, decorative light generating systems, portable systems, automotive applications, green house light generating systems, horticulture lighting, or LCD backlighting, etc. The light generating system may also be part of or may be applied in e.g. material curing systems, additive manufacturing systems, metrology systems, UV sterilization system, (IR) imaging systems, fiber illumination systems, etc. In an aspect, the invention also provides a projection system or a luminaire comprising the light generating system as described herein, or a plurality of such light generating systems.

In an aspect, the invention also provides a projection system or a luminaire comprising the system as defined herein. In yet a further aspect, the invention also provides the system as defined herein for use as a light source in (fluorescence) microscopy and endoscopy, and thus also provides a (fluorescence) microscope or endoscope comprising such system. Hence, the light generating system may also be used for microscopy illumination or endoscopy illumination. In yet a further aspect, the invention provides a projector comprising the light generating system as defined herein. As indicated above, of course the light projector may also include a plurality of such light generating systems.

Here, the term "light generating system" may also be used for a (digital) projector. Further, the light generating system may be used for e.g. stage lighting (see further also below), or architectural lighting, or be applied in a (fluorescence) microscopy or endoscopy light generating system. Therefore, in embodiments the invention also provides a light generating system as defined herein, wherein the light generating system comprises a digital projector, a stage light generating system or an architectural light generating system. The light generating system may comprise one or more light generating systems as defined herein and optionally one or more second light generating systems configured to provide second light generating system light, wherein the light generating system light comprises (a) one or more of (i) the converter radiation as defined herein, and optionally (b) second light generating system light. Hence, the invention also provides a light generating system configured to provide visible light, wherein the light generating system comprises at least one light generating system as defined herein. For instance, such light generating system may also comprise one or more (additional) optical elements, like one or more of optical filters, collimators, reflectors, wavelength converters, lens elements, etc. The light generating system may be, for example, a light generating system for use in an automotive application, like a headlight. Hence, the invention also provides an automotive light generating system configured to provide visible light, wherein the automotive light generating system comprises at least one light generating system as defined herein and/or a digital projector system comprising at least one light generating system as defined herein. Especially, the light generating system may be configured (in such applications) to provide red light. The automotive light generating system or digital projector system may also comprise a plurality of the light generating systems as described herein.

Alternatively, the light generating system may be designed to provide high intensity UV radiation, e.g. for 3D printing technologies or UV sterilization applications. Alternatively, the light generating system may be designed to provide a high intensity IR light beam, e.g., to project IR images for (military) training purposes.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL, such as within about 3 SDCM from the BBL.

The elongated light transmissive body, and optionally also the optical element, may comprise light transmissive host material (thus not taking into account the luminescent material, or more especially in embodiments a luminescent species such as trivalent cerium), especially light transparent material for one or more wavelengths in the visible, such as in the green and red, and in general also in the blue. Suitable host materials may comprise one or more materials selected from the group consisting of a transmissive organic material, such as selected from the amorphous polymers group, e.g. PC (polycarbonate), polymethylacrylate (PMA), polymethylmethacrylate (PMMA) (Plexiglas or Perspex), cellulose acetate butyrate (CAB), silicone, PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly (3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN). Hence, the light transmissive material is especially a polymeric light transmissive material.

However, in another embodiment the light transmissive material may comprise an inorganic material. Especially, the inorganic light transmissive material may be selected from the group consisting of glasses, (fused) quartz, transmissive ceramic materials (such as garnets), and silicones. Glass ceramic materials may also be applied. Also, hybrid materials, comprising both inorganic and organic parts may be applied. Especially, the light transmissive material comprises one or more of PMMA, transparent PC, or glass.

When a luminescent material, like an inorganic luminescent material, quantum dots, organic molecules, etc., are embedded in a host matrix, the concentration of the luminescent material may in embodiments be selected from the range of 0.01-5 wt % (weight %), such as 0.01-2 wt %.

High brightness light sources may be used in e.g. front projectors, rear projectors, studio lighting, stage lighting, entertainment lighting, automotive front lighting, architectural lighting, augmented illumination (incl. data/content), microscopy, metrology, medical applications, e.g. digital pathology, etc.

Instead of $A_3B_5O_{12}$, the invention may also be applied with another cerium comprising material, such as e.g. $M_2SiO_5:Ce^{3+}$, wherein M refers to one or more elements selected from the group of lanthanides and yttrium, especially wherein M comprises one or more of Y, La, Gd, and Lu. All embodiments described herein may also be applied in relation to such luminescent material.

Amongst others, the invention may also provide a solid rod holder that may acts as a sturdy building block, to which other elements (e.g. cooling means, i.e. heat sinks) can be mounted, that may effectively cool and/or protects the rod and LEDs against mechanical loads, as well as dust ingress. In embodiments, additionally to this block, one or more spring elements may be added to suspend the rod and to ensure its thermal contact with the block.

Especially, the invention also provides in embodiments a rod holder in combination with one or more simple springs, configured to hold the rod in the rod holder cavity and especially a highly reflective (Miro) reflector to improve optical recycling. In this way, the rod and rod holder in combination may form a single solid part. This part can be thermally connected to other parts, e.g. a heat sink, or can be thermally coupled to another part e.g. the LED board, which may in embodiments than forms the thermal interface. Furthermore, the rod inside the rod holder may be insulated from external forces, other than those imposed by the springs, which may be highly advantageous when external heat sinks are being applied (most likely clamped) onto the complete module.

Herein, the term "Miro" refers to reflective material, especially from Alanod/Westlake Metal Ind., that have a high (surface) reflectivity. Especially, such reflective material is highly specular reflective, with equal to or less than 10%, such as equal to or less than 6% diffuse reflection under perpendicular radiation, the remainder being specular reflection, especially under irradiation with visible light. Hence, the Miro reflective material may be applied (herein) as specular reflector.

In specific embodiments the body holder structure may comprise AlSiMgMn.

In embodiments the body holder structure may not be a monolithic block, but may comprise at least two elements. The at least two elements may have essentially the same length, which may be essentially the length of the elongated luminescent body. When using two or more body holder elements, the elongated body can be positioned between these body elements. Thermal contact can be very high.

An essentially single-piece aluminum block (first body holder element) may allow for a relatively very robust assembly with minimal dust ingress and ample means for fixating heavy heat sinks for good thermal dissipation. One or more springs may support the rod on both ends, especially in such a way that no bending moment is exerted onto the rod.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the light transmissive body. The light guide or waveguide may convert the light of the first spectral distribution to another spectral distribution and guides the light to an exit surface.

Figure 1A:
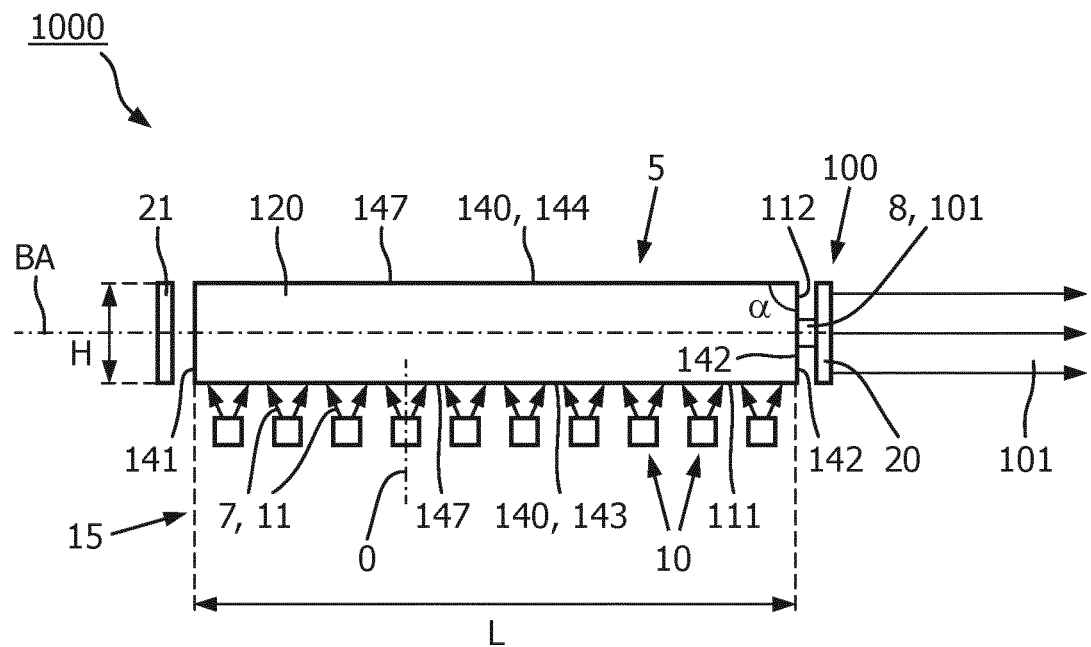
FIGS. 1a-1f schematically depict some aspects of the invention.

An embodiment of the light generating system as defined herein is schematically depicted in FIG. 1a. FIG. 1a schematically depicts a light generating system 1000 comprising a plurality of solid state light sources 10 and a luminescent concentrator 5 comprising an elongated light transmissive body 100 having a first face 141 and a second face 142 defining a length L of the elongated light transmissive body 100. The elongated light transmissive body 100 comprising one or more radiation input faces 111, here by way of example two oppositely arranged faces, indicated with references 143 and 144 (which define e.g. the height H), which are herein also indicated as edge faces or edge sides 147. Further the light transmissive body 100 comprises a radiation exit window 112, wherein the second face 142 comprises the radiation exit window 112. The entire second face 142 may be used or configured as radiation exit window. The plurality of solid-state light sources 10 are configured to provide (blue) light source light 11 to the one or more radiation input faces 111. As indicated above, they especially are configured to provide to at least one of the radiation input faces 111 a blue power $W_{opt}$ of in average at least 0.067 Watt/mm². Reference BA indicates a body axis, which will in cuboid embodiments be substantially parallel to the edge sides 147. Reference 140 refers to side faces or edge faces in general.

The elongated light transmissive body 100 may comprise a ceramic material 120 configured to wavelength convert at least part of the (blue) light source light 11 into converter light 101, such as at least one or more of green and red converter light 101. As indicated above the ceramic material 120 comprises an $A_3B_5O_{12}:Ce^{3+}$ ceramic material, wherein A comprises e.g. one or more of yttrium (Y), gadolinium (Gd) and lutetium (Lu), and wherein B comprises e.g. aluminum (Al). References 20 and 21 indicate an optical filter and a reflector, respectively. The former may reduce e.g. non-green light when green light is desired or may reduce non-red light when red light is desired. The latter may be used to reflect light back into the light transmissive body or waveguide, thereby improving the efficiency. Note that more reflectors than the schematically depicted reflector may be used. Note that the light transmissive body may also essentially consist of a single crystal, which may in embodiments also be $A_3B_5O_{12}:Ce^{3+}$.

The light sources may in principle be any type of light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light sources 10 are configured to provide light source light 11, which is used as pump radiation 7. The luminescent material 120 converts the light source light into luminescent material light 8 (see also FIG. 1e). Light escaping at the light exit window is indicated as converter light 101, and will include luminescent material light 8. Note that due to reabsorption part of the luminescent material light 8 within the luminescent concentrator 5 may be reabsorbed. Hence, the spectral distribution may be redshifted relative e.g. a low doped system and/or a powder of the same material. The light generating system 1000 may be used as luminescent concentrator to pump another luminescent concentrator.

Figure 1B:
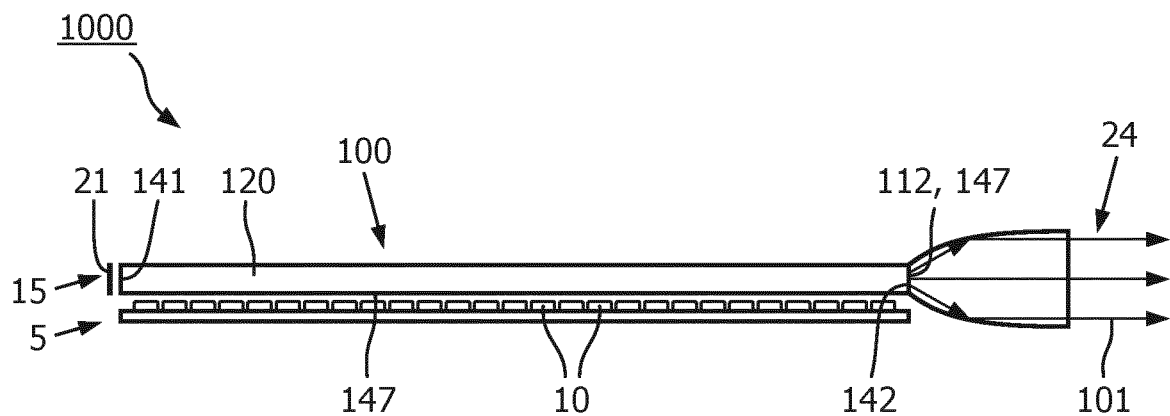

FIGS. 1a-1b schematically depict similar embodiments of the light generating system. Further, the light generating system may include further optical elements, either separate from the waveguide and/or integrated in the waveguide, like e.g. a light concentrating element, such as a compound parabolic light concentrating element (CPC). The light generating systems 1 in FIG. 1b further comprise a collimator 24, such as a CPC.

As shown in FIGS. 1a-1b and other Figures, the light guide has at least two ends, and extends in an axial direction between a first base surface (also indicated as first face 141) at one of the ends of the light guide and a second base surface (also indicated as second face 142) at another end of the light guide.

The collimator 24 may be supported by an optics interface plate (not shown).

FIG. 1a also schematically depicts an embodiment wherein the radiation exit window 112 has an angle (α) unequal to 0° and unequal to 180° with one or more of the one or more side faces 140. Further, the radiation input face 111 and the radiation exit window 112 may have an angle α unequal to 0° and unequal to 180° with one or more of the one or more side faces 140. Here, angle α is 90°.

Reference 15 indicates an array of light sources 10. In FIG. 1a, and some of the further figures, the n force applying elements are not yet schematically drawn (see further e.g. FIGS. 3a-3c).

Reference 15 indicates an array (of light sources 10).

Figure 1C:
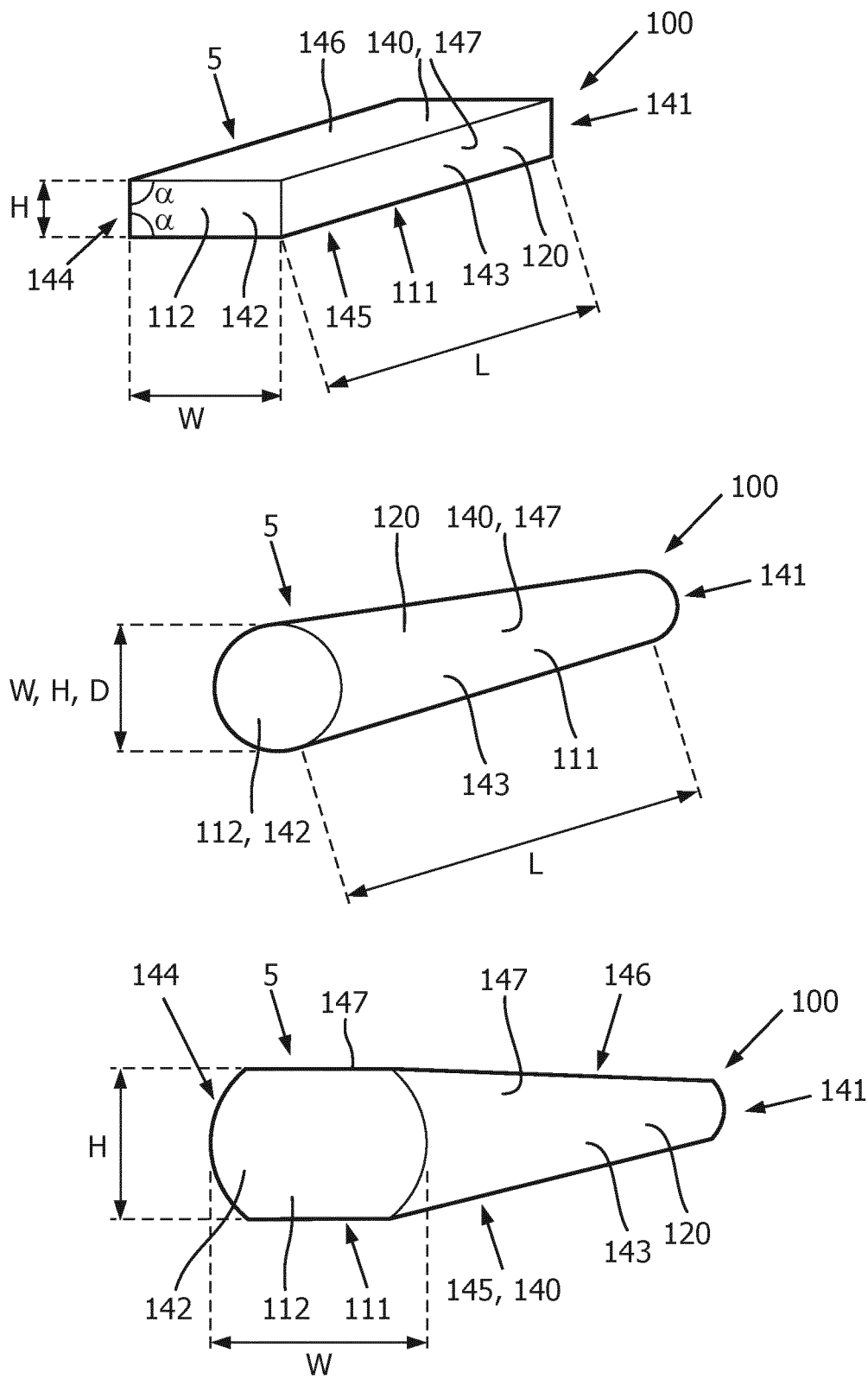

FIG. 1c schematically depicts some embodiments of possible ceramic bodies or crystals as waveguides or luminescent concentrators. The faces are indicated with references 141-146. The first variant, a plate-like or beam-like light transmissive body has the faces 141-146. Light sources, which are not shown, may be arranged at one or more of the faces 143-146 (general indication of the edge faces is reference 147). The second variant is a tubular rod, with first and second faces 141 and 142, and a circumferential face 143. Light sources, not shown, may be arranged at one or more positions around the light transmissive body. Such light transmissive body will have a (substantially) circular or round cross-section. The third variant is substantially a combination of the two former variants, with two curved and two flat side faces. In the embodiment having a circular cross-section the number of side faces may be considered unlimited (co).

In the context of the present application, a lateral surface of the light guide should be understood as the outer surface or face of the light guide along the extension thereof. For example in case the light guide would be in form of a cylinder, with the first base surface at one of the ends of the light guide being constituted by the bottom surface of the cylinder and the second base surface at the other end of the light guide being constituted by the top surface of the cylinder, the lateral surface is the side surface of the cylinder. Herein, a lateral surface is also indicated with the term edge faces or side 140.

The variants shown in FIG. 1c are not limitative. More shapes are possible; i.e. for instance referred to WO2006/054203, which is incorporated herein by reference. The ceramic bodies or crystals, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ratio (of length/width) is especially larger than 1, such as equal to or larger than 2, such as at least 5, like even more especially in the range of 10-300, such as 10-100, like 10-60, like 10-20. Unless indicated otherwise, the term "aspect ratio" refers to the ratio length/width. FIG. 1c schematically depicts an embodiment with four long side faces, of which e.g. two or four may be irradiated with light source light.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Note that in all embodiments schematically depicted herein, the radiation exit window is especially configured perpendicular to the radiation input face(s). Hence, in embodiments the radiation exit window and radiation input face(s) are configured perpendicular. In yet other embodiments, the radiation exit window may be configured relative to one or more radiation input faces with an angle smaller or larger than 90°.

Note that, in particular for embodiments using a laser light source to provide light source light, the radiation exit window might be configured opposite to the radiation input face(s), while the mirror 21 may consist of a mirror having a hole to allow the laser light to pass the mirror while converted light has a high probability to reflect at mirror 21. Alternatively or additionally, a mirror may comprise a dichroic mirror.

Figure 1D:
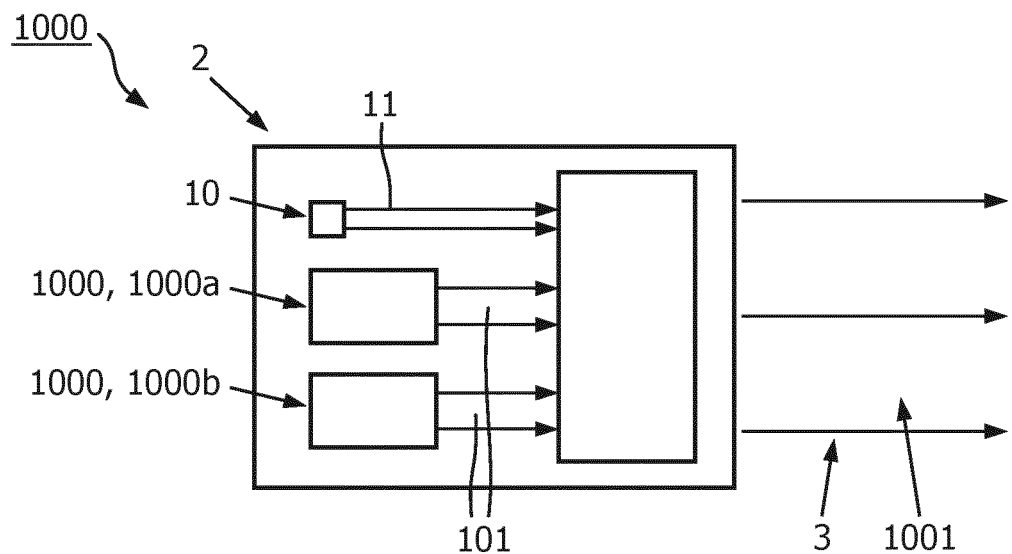

FIG. 1d very schematically depicts a projector or projector device 2 comprising the light generating system 1000 as defined herein. By way of example, here the projector 2 comprises at least two light generating systems 1000, wherein a first light generating system 1000a is configured to provide e.g. green light 101 and wherein a second light generating system 1000b is configured to provide e.g. red light 101. Light source 10 is e.g. configured to provide blue light. These light sources may be used to provide the projection (light) 3. Note that the additional light source 10, configured to provide light source light 11, is not necessarily the same light source as used for pumping the luminescent concentrator(s). Further, here the term "light source" may also refer to a plurality of different light sources. The projector device 2 is an example of a light generating system 1000, which light generating system is especially configured to provide light generating system light 1001, which will especially include light generating system light 101.

High brightness light sources are interesting for various applications including spots, stage-lighting, headlamps and digital light projection.

Figure 1E:
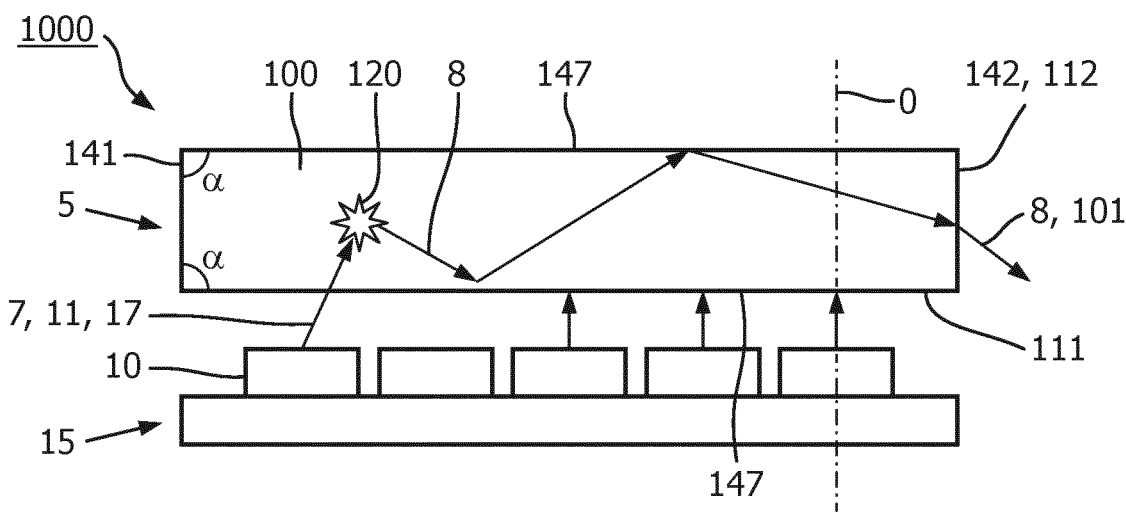

For this purpose, it is possible to make use of so-called luminescent concentrators where shorter wavelength light is converted to longer wavelengths in a highly transparent luminescent material. A rod of such a transparent luminescent material can be used and then it is illuminated by LEDs to produce longer wavelengths within the rod. Converted light which will stay in the luminescent material such as a doped garnet in the waveguide mode and can then be extracted from one of the surfaces leading to an intensity gain (FIG. 1e).

High-brightness LED-based light source for beamer applications appear to be of relevance. For instance, the high brightness may be achieved by pumping a luminescent concentrator rod by a discrete set of external blue LEDs, whereupon the phosphor that is contained in the luminescent rod subsequently converts the blue photons into green or red photons. Due to the high refractive index of the luminescent rod host material (typically 1.8) the converted green or red photons are almost completely trapped inside the rod due to total internal reflection. At the exit facet of the rod the photons are extracted from the rod by means of some extraction optics, e.g. a compound parabolic concentrator (CPC), or a micro-refractive structure (micro-spheres or pyramidal structures). As a result, the high luminescent power that is generated inside the rod can be extracted at a relatively small exit facet, giving rise to a high source brightness, enabling (1) smaller optical projection architectures and (2) lower cost of the various components because these can be made smaller (in particular the, relatively expensive, projection display panel).

Figure 1F:
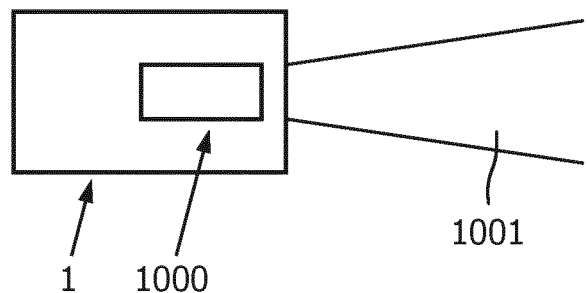

FIG. 1f schematically depicts an embodiment of a luminaire 1 (or other type of lighting device) comprising the light generating system 1000. The luminaire 1 provide light which may—in a control mode of the luminaire—comprise the lighting system light 1001.

Figure 2A:
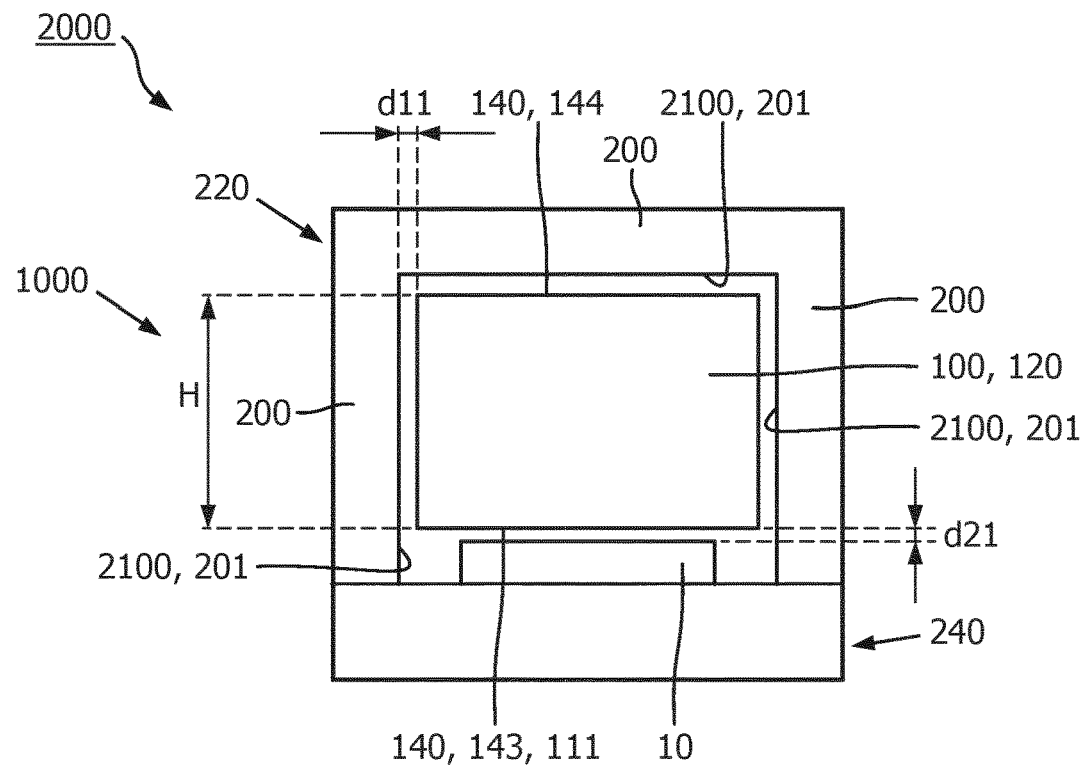
FIG. 2a schematically shows an embodiment of a cross section of configuration with single-sided illumination of luminescent rod. The inner sides of the cooling block(s) may be made reflective or covered by a mirror.
Figure 2B:
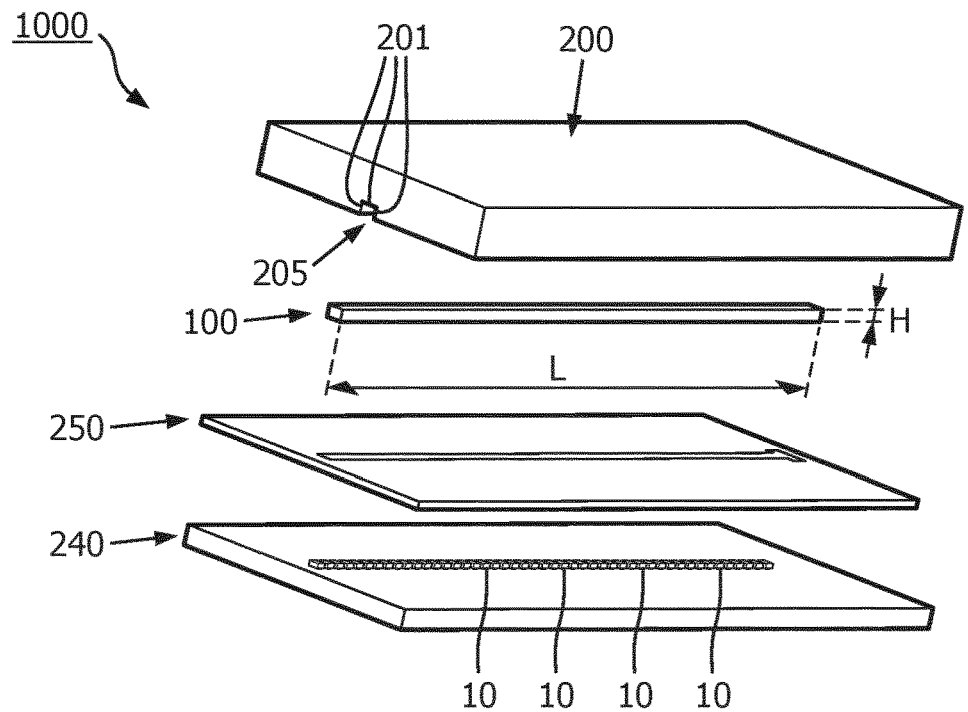
FIG. 2b provides a schematic representation of single-sided concept.

FIGS. 2a-2b schematically depict embodiments of a light generating system 1000 comprising a light source 10 configured to provide light source light 11 and an elongated luminescent body 100 having a length L (see FIG. 2b).

As indicated above, the elongated luminescent body 100 comprises (n) side faces 140, here 4, over at least part of the length. The (n) side faces 140 comprise a first side face 143, comprising a radiation input face 111, and a second side face 144 configured parallel to the first side face 143, wherein the side faces 143, 144 define a height h.

As indicated above, the elongated luminescent body 100 further comprises a radiation exit window bridging at least part of the height h between the first side face 143 and the second side face 144 (see especially FIG. 1a). The luminescent body 100 comprises a garnet type $A_3B_5O_{12}$ luminescent material 120 comprising trivalent cerium, wherein the garnet type $A_3B_5O_{12}$ luminescent material 120 is configured to convert at least part of the light source light 11 into converter light 101.

Further, the light generating system 1000 comprises one or more heat transfer elements 200 in thermal contact with one or more side faces 140 and a reflector 2100 configured at the second side face 144 and configured to reflect light source light 11 escaping from the elongated luminescent body 100 via second face 144 back into the elongated luminescent body 100.

The one or more heat transfer elements 200 are especially configured parallel to at least part of one or more of the side faces 140 over at least part of the length of the elongated luminescent body 100 at a shortest distance (d11) from the respective one or more side faces 140. The shortest distance d11 is especially 1 µm≤d11≤100 µm.

As shown in FIGS. 2a-2b, the one or more heat transfer elements 200 comprise one or more heat transfer element faces 201 directed to one or more side faces 140. As shown in these schematic drawings, the one or more heat transfer elements 200 are at least in thermal contact with all side faces 140 other than the first side face 143. Further, as also shown in these schematic drawings, the one or more heat transfer elements 200 may be configured as a monolithic heat transfer element 220. In embodiments, this monolithic heat transfer element 220 is configured in thermal contact with a support 240 for the light source 10. The one or more heat transfer elements 200 may especially be configured for guiding away heat from the luminescent body 100.

A heat transfer element face 201 of the one or more heat transfer element 200 directed to the second face 144 comprises the reflector 2100. Here, all faces 201 directed to the luminescent body 100 comprise such reflector 2100.

FIG. 2b schematically depict another embodiment of the monolithic heat transfer element 220, including a slit 205 configured to host the luminescent body 100. The light sources 10 may be provided as LED bar. The monolithic heat transfer element 220 is used for cooling of the luminescent body 100.

The optional intermediate plate, indicated with reference 250, may serve as a spacer to keep the luminescent body at the desired distance from the light sources and may also serve as a reflector for the light that escapes from the luminescent body side faces. As an alternative, the spacer could be integrated with the one or more heat transfer element 200, especially a top one or more heat transfer element 200 (such as a top cooling block).

In FIGS. 2a-2b, the one or more heat transfer elements are configured within a circle section of at least 180°, here in fact about 270°.

As shown above, the light generating system 1000 comprises in embodiments a plurality of light sources 10 configured to provide light source light 11 and an elongated luminescent body 100 comprising one or more side faces 140, the elongated luminescent body 100 comprising a radiation input face 111 and a radiation exit window 112, wherein the radiation input face 111 is configured in a light receiving relationship with the plurality of light sources 10, wherein the elongated luminescent body 100 comprises luminescent material 120 configured to convert at least part of light source light 11 (received at the radiation input face 111) into luminescent material light 8.

Figure 3A:
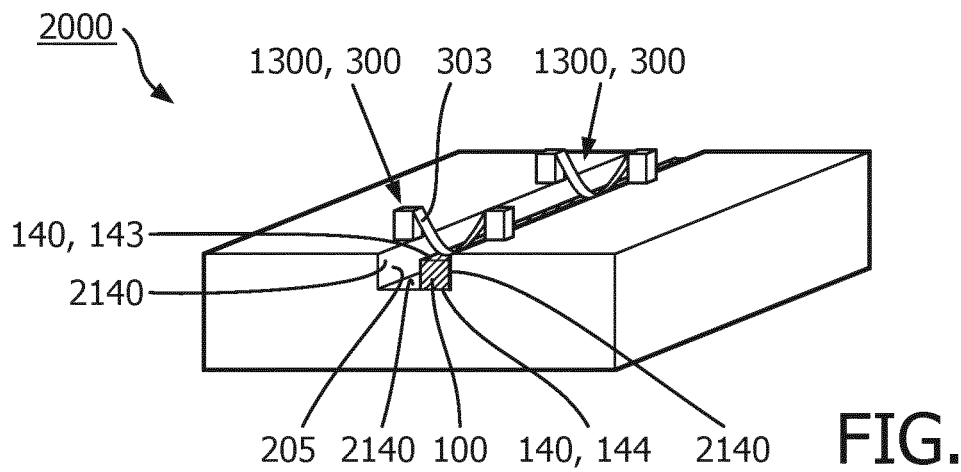
FIGS. 3a-3e schematically depict some further aspects.

FIG. 3a schematically depict an embodiment of a body holder structure 2000. The body holder structure 2000 comprises an elongated slit 205 for hosting the elongated luminescent body 100. As shown, the elongated slit 205 and the elongated luminescent body 100 have dimensions such that there is clearance between one or more of the one or more side faces 140 and the elongated slit 205.

Further, the light generating system may comprise one or more spring elements 300 configured to keep the elongated body 100 pushed into the elongated slit 205. Schematically, embodiments of two spring elements 300 are schematically depicted in FIG. 3a. Note that the contact area between the spring elements 300 and the elongated body 100 is only a fraction of the relevant side face, here indicated as side face 143. As shown in FIG. 3a and some other drawings, there may be at least two spatially different contact points of the one or more spring elements 300 with elongated luminescent body 100.

Hence, as shown the elongated luminescent body 100 comprises a plurality of N side faces 140, and wherein the elongated slit 205 comprises N−1 slit side faces 2140, wherein one or more of the side faces 140 are in thermal contact with one or more of the slit side faces 2140. The slit 205 may also comprise less than N−1 side faces, but especially at least two.

Reference 1300 indicates a force applying element, such as the spring element. Reference 303 indicates a clamping position or contact point (contact area), i.e. where the force applying element clamps the body 100 to the rod holder 2000.

Figure 3B:
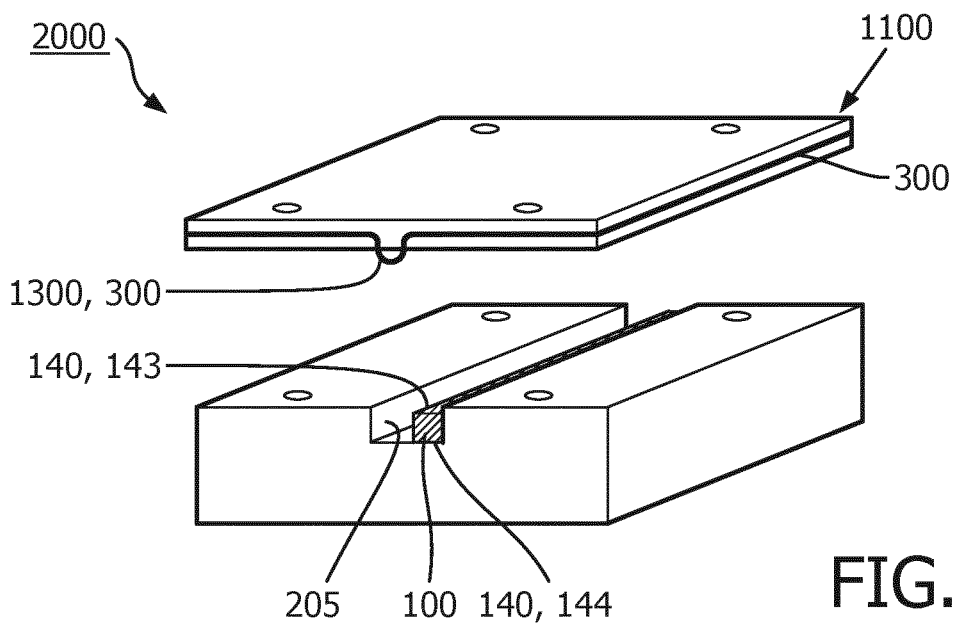
Figure 3C:
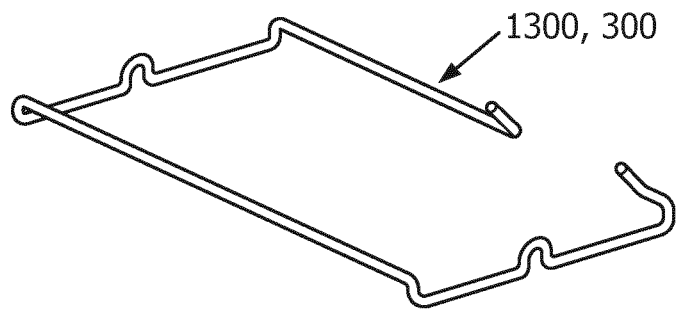
Figure 3D:
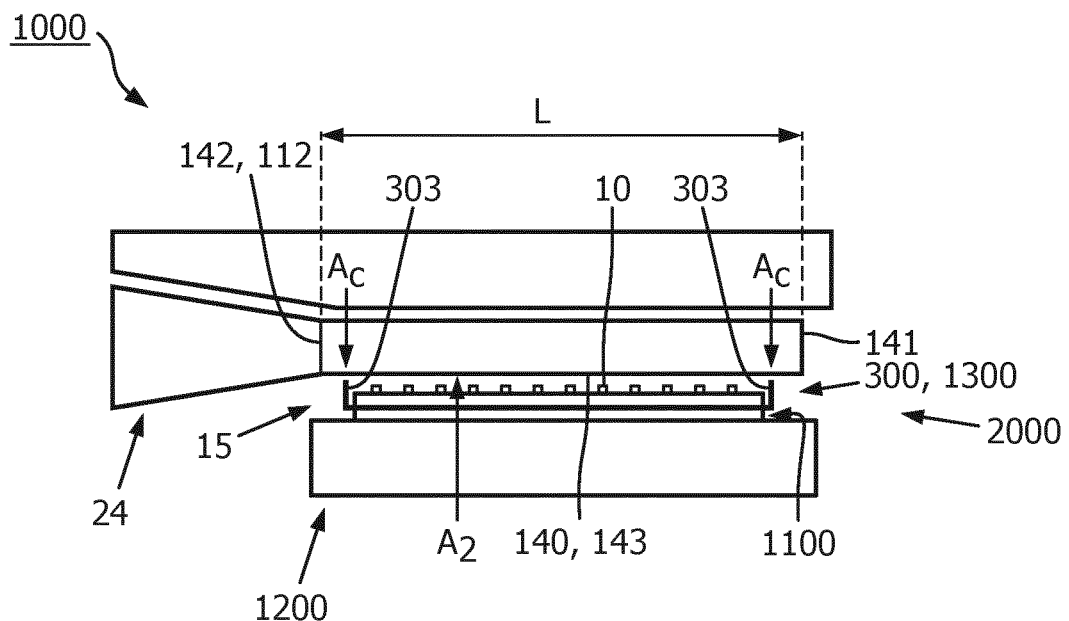

FIG. 3b schematically depicts an embodiment wherein a single spring wire 300 is applied, attached to a support 1100, which may be a support for the plurality of light sources (see also below). FIG. 3c schematically depicts in more detail such single spring wire 300. FIG. 3d schematically depicts an embodiment of the system 1000 in some more detail. The elongated luminescent body 100 comprises a first face 141 and a second face 142 defining a length L of the elongated luminescent body 100, wherein the second face 142 comprises the radiation exit window 112. The first side face 143 has first area A2. The one or more spring elements 300 are in physical contact with a contact area Ac of the first side face 143, wherein the contact area Ac is at maximum 20% of the first area A2, here, much smaller, such as at maximum a few percent. The collimator 24 may be supported by an optics interface plate (not shown).

As shown in the embodiments of FIGS. 3a-3d, the one or more spring elements 300 are configured in contact with the first side face 143 at 1-4 positions distributed over the length L of the elongated luminescent body 100.

Figure 3E:
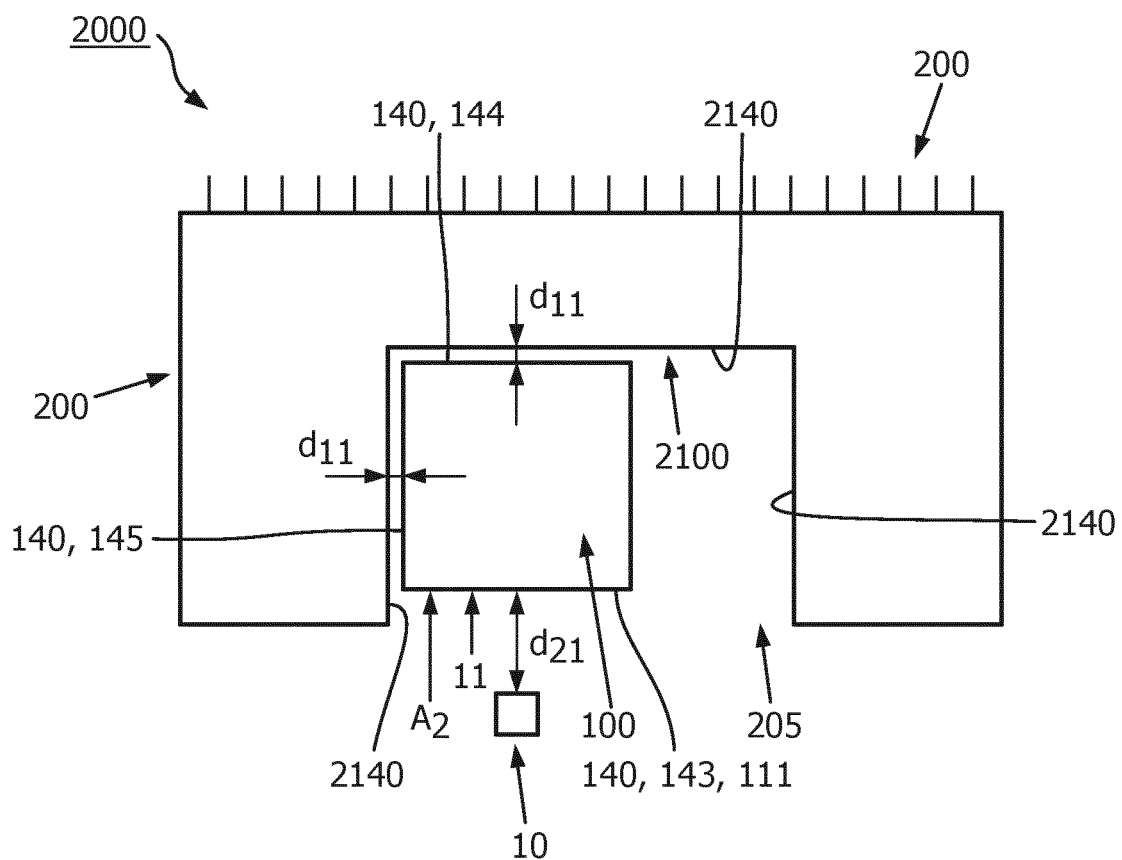

FIG. 3e schematically depicts in some more detail an embodiment wherein a side face 140 is in thermal contact with a slit side face 2140. Thermal contact without essential optical contact may be achieved by distance holders or by having only a limited area in physical contact with the slit side face 2140 (or only a limited area of the slid side face 2140 having physical contact with the side face 140. Hence, even though being in physical contact, a first average distance d11 may be larger than zero. In embodiments, the first average distance d11 may be at least 1 μm from the slid side face 2140. In the embodiment of FIG. 3e, two of the side faces 140 are in thermal contact with two of the slit side faces 2140.

FIG. 3d also schematically depicts an embodiment comprising one or more second heat transfer elements 1200 for guiding away heat from the plurality of light sources 10. The light sources 10 may be configured on a support 1100. The heat transfer elements 1200 may be in thermal contact with the support, or may form a single body and be a support for the light sources 10.

As schematically shown in FIG. 3e, the one or more of the slit side faces 2140 being in thermal contact with one or more of the side faces 140 comprises one or more reflectors 2100 being reflective for at least part of the light source light 11 (and for at least part of the luminescent material light). Especially, at least a slit side face 2140 configured opposite of the light sources 10, with the elongated luminescent body 100 configured between that slit side face 2140 and the light sources 10, comprises a reflector 2100.

In embodiments, the surface of 2000 may exhibit reflecting properties by nature e.g. reflective aluminum. Hence, in this way the slit side face 2140 may comprise a reflector 2100. FIGS. 3d and 3e also show an embodiment wherein the elongated luminescent body 100 comprises a first side face 143 and a second side face 144 defining a height H, wherein the one or more spring elements 300 are in thermal contact with part of the first side face 143, wherein the first side face 143 comprises the radiation input face 111, and wherein the second side face 144 is in thermal contact with one of the slit side faces 2140. FIG. 3e, and some other Figures, show embodiments wherein the plurality of N side faces 140 are configured perpendicular to the first face 141, and wherein the light sources 10 are configured to irradiate at least part of a single side face 140 only. As shown in e.g.

FIG. 3e, the body holder structure 2000 comprises one or more heat transfer elements 200. This may be body as well as the heat fins. They may in embodiments be a single body. Hence, in embodiments the body holder structure 2000 is a monolithic body. However, in other embodiments the body holder structure may comprise a plurality of elements which may be assembled and which may thereby form the slit 205.

In embodiments, the invention may make use of a reflective cavity that enables efficient coupling of pump light via three sides of the rod. This may enable use of multiple rows of LEDs on a support and/or may also enables the use of bigger LEDs and/or even LEDs that have besides top emitting a (significant) part of side emission.

Figure 4A:
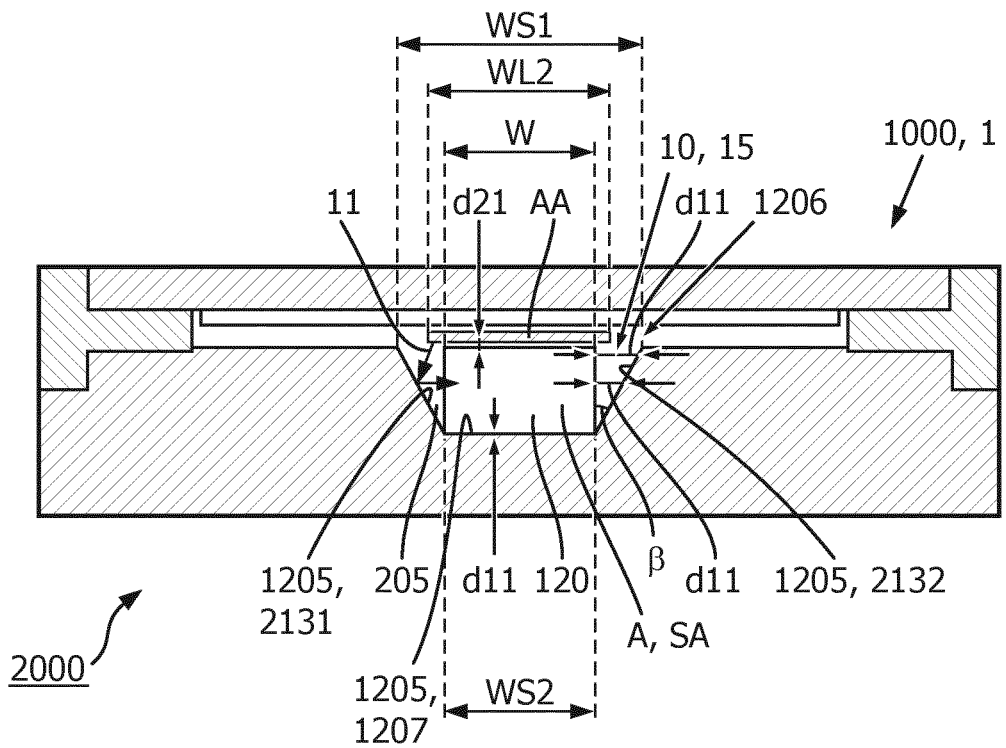
FIGS. 4a-4m (schematically) depict some aspects and variants, as well as some results. The schematic drawings are not necessarily on scale.

An embodiment (including some variants) of the invention is schematically illustrated in FIG. 4a. For instance, light generated by the LEDs will be coupled into the rod directly (as normally the HLD modules) but also via the reflective cavity. This may result in an increase of the efficiency of coupling light into the rod. This example cavity as used in calculations. Angle rod reflective wall is 30°. The reflective cavity enables multiple rows of LEDs (FIG. 4b), use of very large LEDs much wider than the rod with (FIGS. 4a, 3c, 4d, 4e, 4j, 4k, 4l, 4m). In the table below results of a ray-set model calculations are provided. For a rod cross section of 1.2×1.56 mm, a LED-rod distance of 150 µm, a reflective cavity as illustrated in FIG. 4a with angle of reflective wall of 30°. Different reflectivity's of the reflective wall were used. With a small LED, for instance the 1×1 mm CSP top emitting LED, the coupling efficiencies is 96% without a cavity. With the described cavity and a reflectivity of 90% the gain in coupling is 1.4%. More beneficial may become the cavity with 2 rows of these LEDs with a distance between the row of 200 µm. Without cavity in coupling efficiency is 69% with the cavity and 90% reflectivity (specular) the coupling efficiency becomes 93%. Example 3 is a LED with dimensions 1.41×1.41 mm and significant side emission, such as e.g. at least 10%. The coupling efficiency without cavity is 87% and this value increases with a cavity up to 93%. With a 4 mm² 2×2 mm LED the coupling efficiency without cavity is 77%. With cavity this becomes 93%. With bigger LEDs and/or multiple row with bigger LEDs the effect of the cavity may become even more important.

| Absolute coupling performance into 1.2 × 1.56 mm rod; distance LED - rod 150 µm with single LED in center | | | | |
| --- | --- | --- | --- | --- |
| Absolute coupling 150 µm | No cavity | Cavity R 85% | Cavity R 90% | Cavity R 95% |
| 1 mm² 1 × 1 CSP | 96% | 97% | 97% | 97% |
| 2 × 1 mm² 1 × 1 CSP 200 µm d | 69% | 91% | 93% | 94% |
| LL FC 2 mm² 1.41 × 1.41 | 87% | 93% | 93% | 94% |
| 4 mm2 (sim 4 × 1 mm² csp) | 77% | 92% | 93% | 94% |
| Padbar 2 mm² (cross) | 92% | 96% | 96% | 97% |

Amongst others FIG. 4a and other figures, schematically depict an embodiment wherein the radiation input face is configured in a light receiving relationship with the plurality of light sources. The one or more of the plurality of light sources are configured to irradiate with the light source light both (i) the radiation input face of the elongated luminescent body directly and (ii) another part of the one or more side faces indirectly via the cavity wall. These part(s) of the one or more side faces that are indirectly irradiated by the light source light effectively provide a further radiation input face. For instance, at least 25%, such as at least 50% of the total number of light sources, or even all, may be configured to irradiate with the light source light both (i) the radiation input face of the elongated luminescent body directly and (ii) another part of the one or more side faces indirectly via the cavity wall.

Figure 4B:
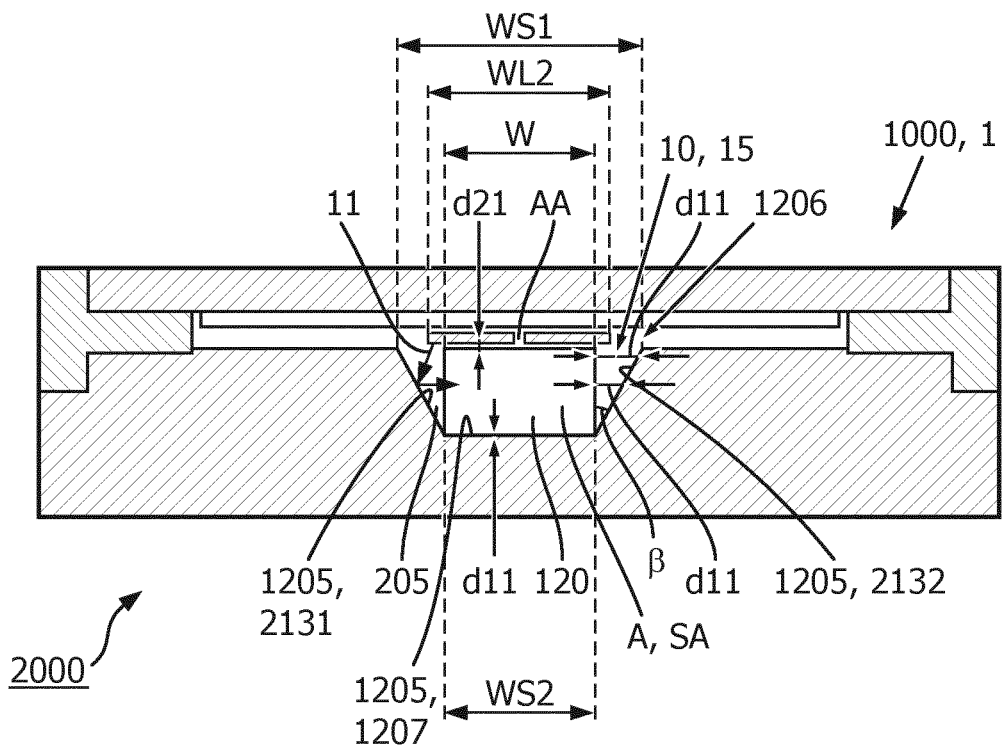
Figure 4C:
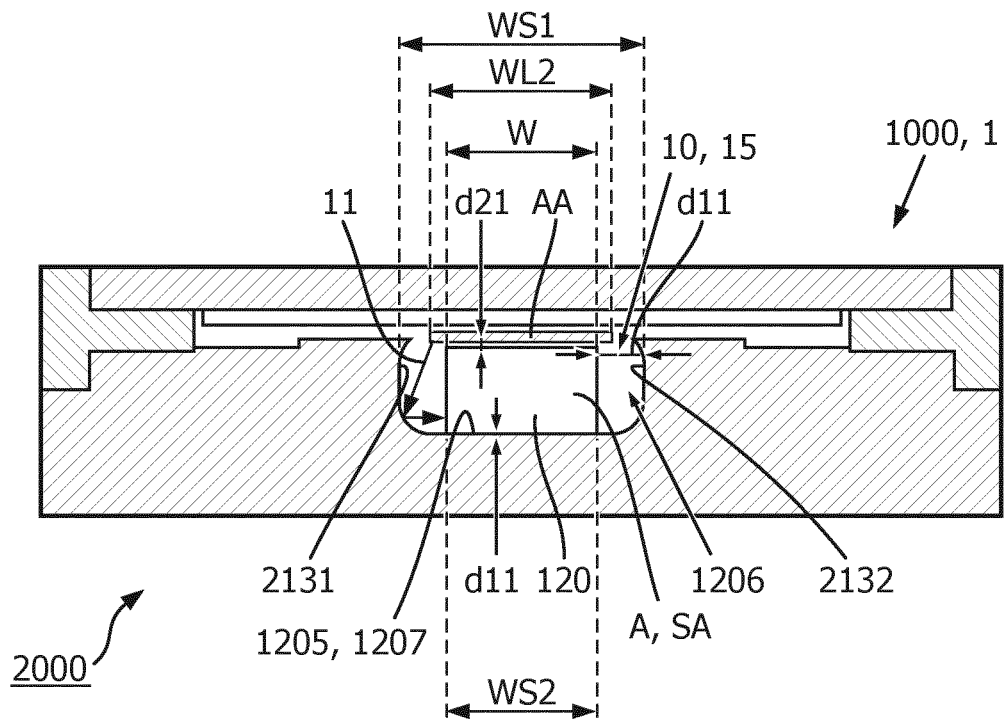
Figure 4D:
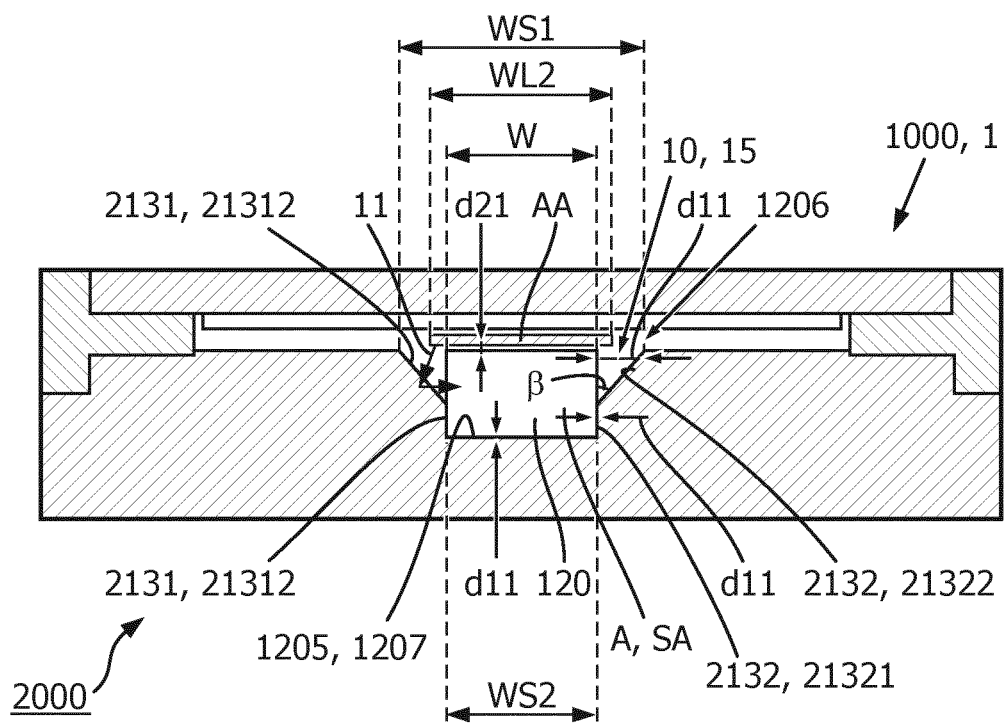
Figure 4E:
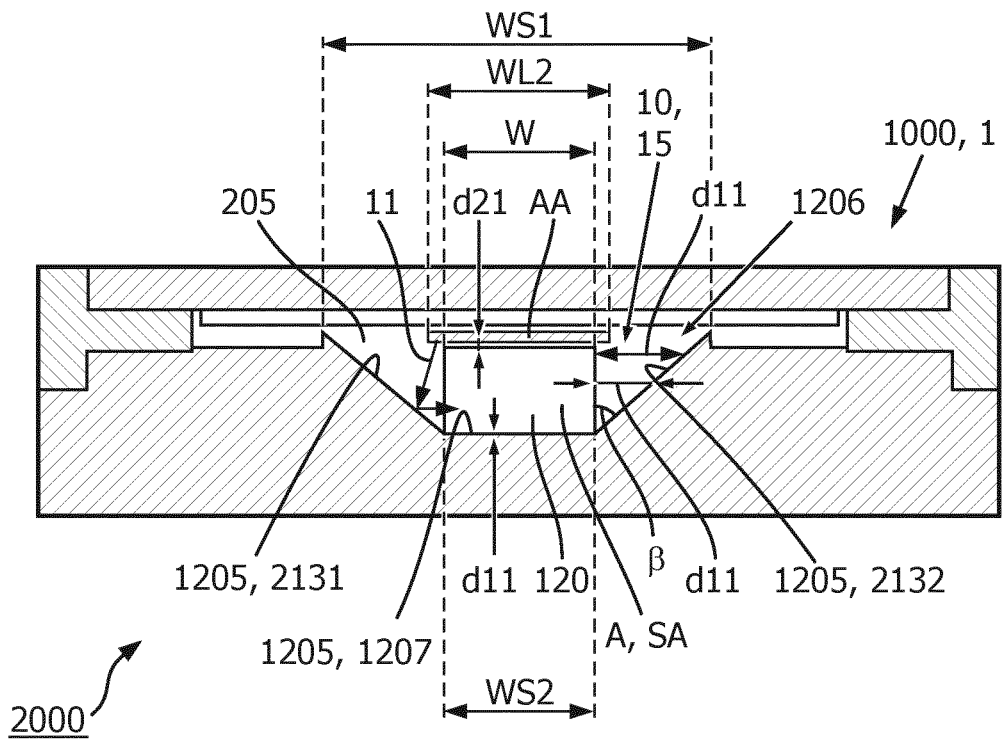

FIG. 4b schematically depicts essentially the same embodiment as schematically depicted in FIG. 4a, but now with a 2D array with two rows of light sources 10. FIG. 4c schematically depicts essentially the same embodiment as schematically depicted in FIG. 4a but here with a curved reflective cavity. Here, the reflective cavity is on the top side close to the support with an additional feature. FIG. 4d schematically depicts essentially the same embodiment as schematically depicted in FIG. 4a but here with the reflective cavity not starting at the bottom of the rod. FIG. 4e schematically depicts essentially the same embodiment as schematically depicted in FIG. 4a but here with a very big reflective cavity.

FIGS. 4a-4m schematically depict embodiments and variants of a light generating system 1000, comprising a plurality of light sources 10, an elongated luminescent body 100, and a body holder structure 2000.

The plurality of light sources 10 are configured to provide light source light 11, wherein the light sources 10 are solid state light sources. The plurality of light sources 10 are configured in a light source array 15. Here, embodiments are schematically depicted of the single-sided lighting concept.

The elongated luminescent body 100 has a length L (see e.g. FIGS. 1 and 1c, etc.) and a width W. The elongated luminescent body 100 comprises luminescent material 120 configured to convert at least part of light source light 11 into luminescent material light. As shown in these cross-sectional vies, the elongated luminescent body 100 and the light source array 15 are configured parallel.

The body holder structure 2000 comprises an elongated slit 205 for hosting the elongated luminescent body 100. The elongated slit 205 has a cavity wall 1205 defining the elongated slit 205 and a slit opening 1206. The slit opening 1206 has a slit opening width WS1, wherein e.g. WS1≥1.1*W. The slit opening width WS1 and the width W of the elongated luminescent body 100 may in specific embodiments have a ratio selected from the range of 1.1≤WS1/W≤5, like in embodiments 1.3≤WS1/W≤5.

The cavity wall 1205 and the elongated luminescent body 100 have first shortest distances d11 that vary over the cavity wall 1205. As schematically depicted, (at least part of) the cavity wall 1205 is reflective for light source light 11.

The light sources 10 are configured at second shortest distances d21 from the elongated luminescent body 100. Especially, the second shortest distance d21 is selected from the range of 40-1000 µm. Especially, the second shortest distance d21 may be selected from the range of 10-500 µm. One or more of the plurality of light sources 10 are configured to irradiate with the light source light 11 the elongated luminescent body 100 both directly and indirectly via the cavity wall 1205.

The clearance, in fact d11 between the cavity wall 1205 at a side face of the elongated luminescent body, may vary over the height of the elongated luminescent body, due to the tapering.

Reference SA indicates the slit axis. Reference AA indicates the light source array axis. Reference A indicates the axis of elongation of the elongated body. The slit axis and the axis of elongation may be configured parallel. The slit axis, the light source array axis, and the axis of elongation may be all configured parallel.

The light source array 15 has a light source array axis AA. Further, the light sources 10 in the light source array 15 have a largest edge-to-edge width WL2 perpendicular to the light source array axis AA. As schematically indicated, the edge-to-edge width WL2 is larger than the width W of the elongated luminescent body 100 and equal to or smaller than the slit opening width WS1. In general, WL2≤2*W, such as WL2≤1.8*W, like especially WL2≤1.5*W, such as e.g. WL2≤1.3*W.

When the light sources comprise solid state light sources that are essentially top emitters, especially WL2≥1.1*W. When the light sources comprise solid state light sources that have both side emission and top emission, in embodiments WL2≥0.85*W. In specific embodiments, the light sources comprise essentially top emitting solid state light sources.

As schematically depicted, the elongated slit 205 has a second slit width WS2 at a slit end 1207 most remote from the slit opening 1206. The slit opening 1206 and the slit end 1207 are bridged by cavity wall parts 2131,2132. The second slit width WS2 at the slit end 1207 is smaller than the slit opening width WS1.

In embodiments, the slit end 1207 is in thermal contact with the elongated luminescent body 100.

As schematically depicted in FIGS. 4*a*, 4*b*, (4*d*), 4*e*, 4*j* and 4*l* the cavity wall parts 2131,2132 are straight and configured slanted, having a slant angle β relative to the elongated luminescent body 100. This angle β may especially be selected from the range of 10-50°, such as 15-45° (see FIG. 4*a*, like selected from the range of 20-40°.

Referring to FIG. 4*a*, and assuming an angle β of about 30°, at least 50% of the light source light (in Watts) is directly be received by the elongated luminescent body and at least 20 of the light source light (in Watts) is indirectly be received by the elongated luminescent body. Hereby, the reflectivity of the side wall may be about 85%, which can even be higher. Light loss may be up to about 10%.

Figure 4F:
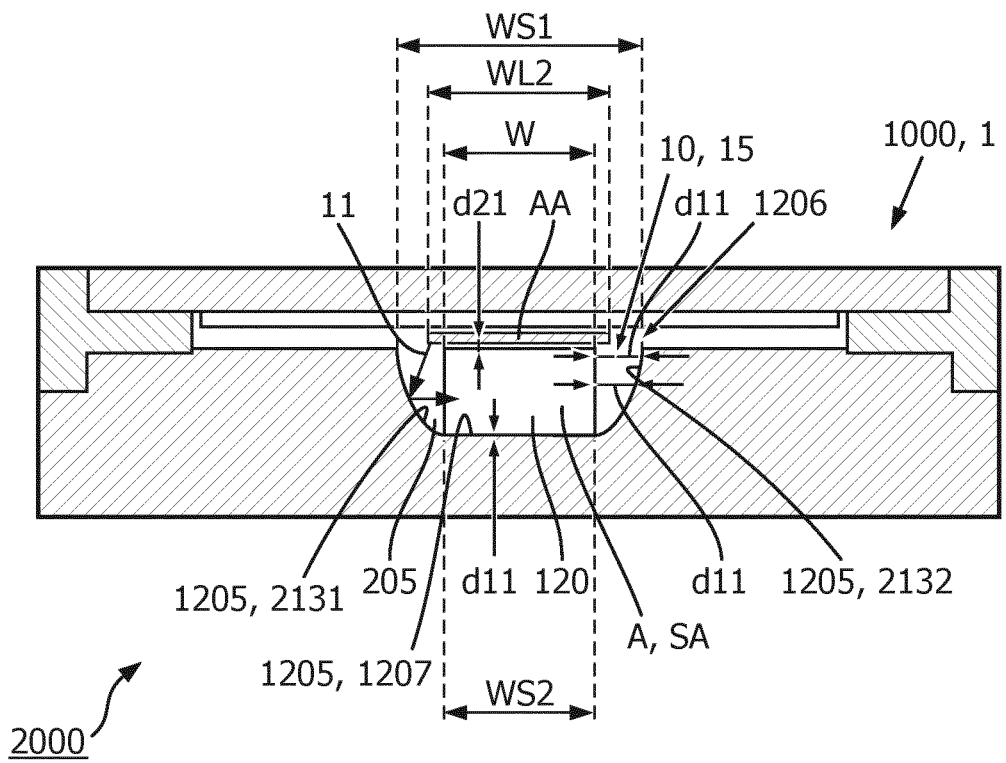

In embodiments, the cavity wall parts 2131,2132 may be curved, see FIG. 4*c* (or FIG. 4*f*).

FIG. 4*d* schematically depicts an embodiment wherein only part of the elongated luminescent body 100 is in thermal contact with the body holder structure 2000.

The cavity wall parts 2131,2132 comprise first parts 21311,21321 that are configured conformal to part of the elongated luminescent body 100 at first shortest distances d11, especially selected from the range of ≤100 μm. The first parts 21311,21321 are configured closer to the slit end 1207 than to the slit opening 1206. Further, the cavity wall parts 2131,2132 may comprise second parts 21312,21322, configured closer to the slit opening 1206 than to the slit end 1207. The second parts 21312,21322 taper in a direction from the slit opening 1206 to the first parts 21311,21321. Here, d11 may be substantially larger and there may essentially be no thermal contact with the body holder structure.

FIG. 4*e* schematically depicts essentially the same embodiment as schematically depicted in FIG. 4*a* but here with a very big reflective cavity.

FIG. 4*f* schematically depicts an embodiment wherein the cavity wall parts 2131,2132 may be curved, especially tapering in a direction from the slit opening 1206 to the slit end 1207. In embodiments, the cavity wall parts 2131,2132 may have the shape of a Bezier curve.

Also here, the clearance, in fact d11 between the cavity wall 1205 at a side face of the elongated luminescent body, may vary over the height of the elongated luminescent body, due to the tapering.

Figure 4G:
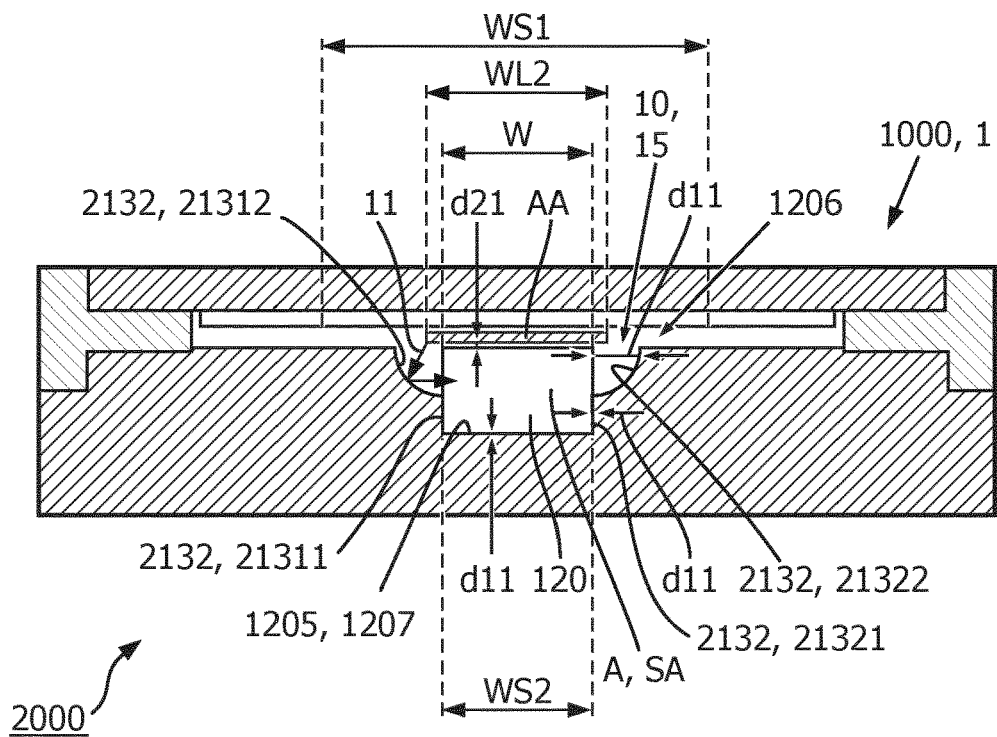

FIG. 4*g* is essentially the same as FIG. 4*d*, with the exception that the second parts 21312,21322, configured closer to the slit opening 1206 than to the slit end 1207, taper in a direction from the slit opening 1206 to the first parts 21311,21321 in a curved way.

Figure 4H:
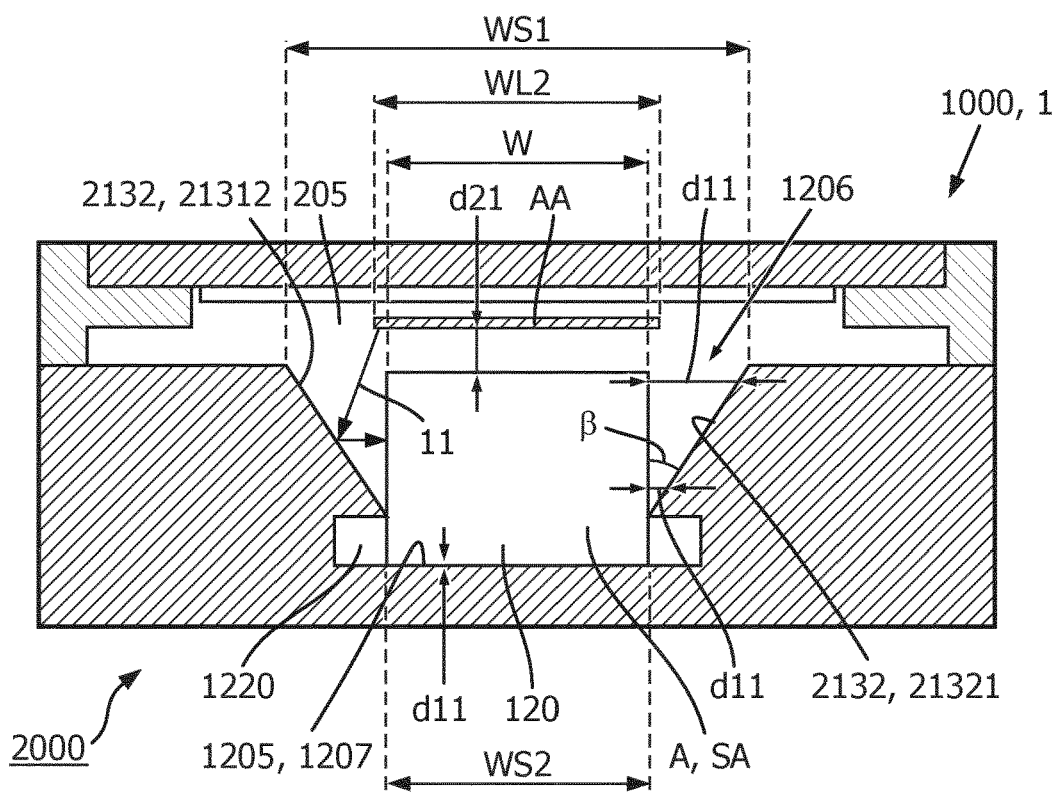
Figure 4I:
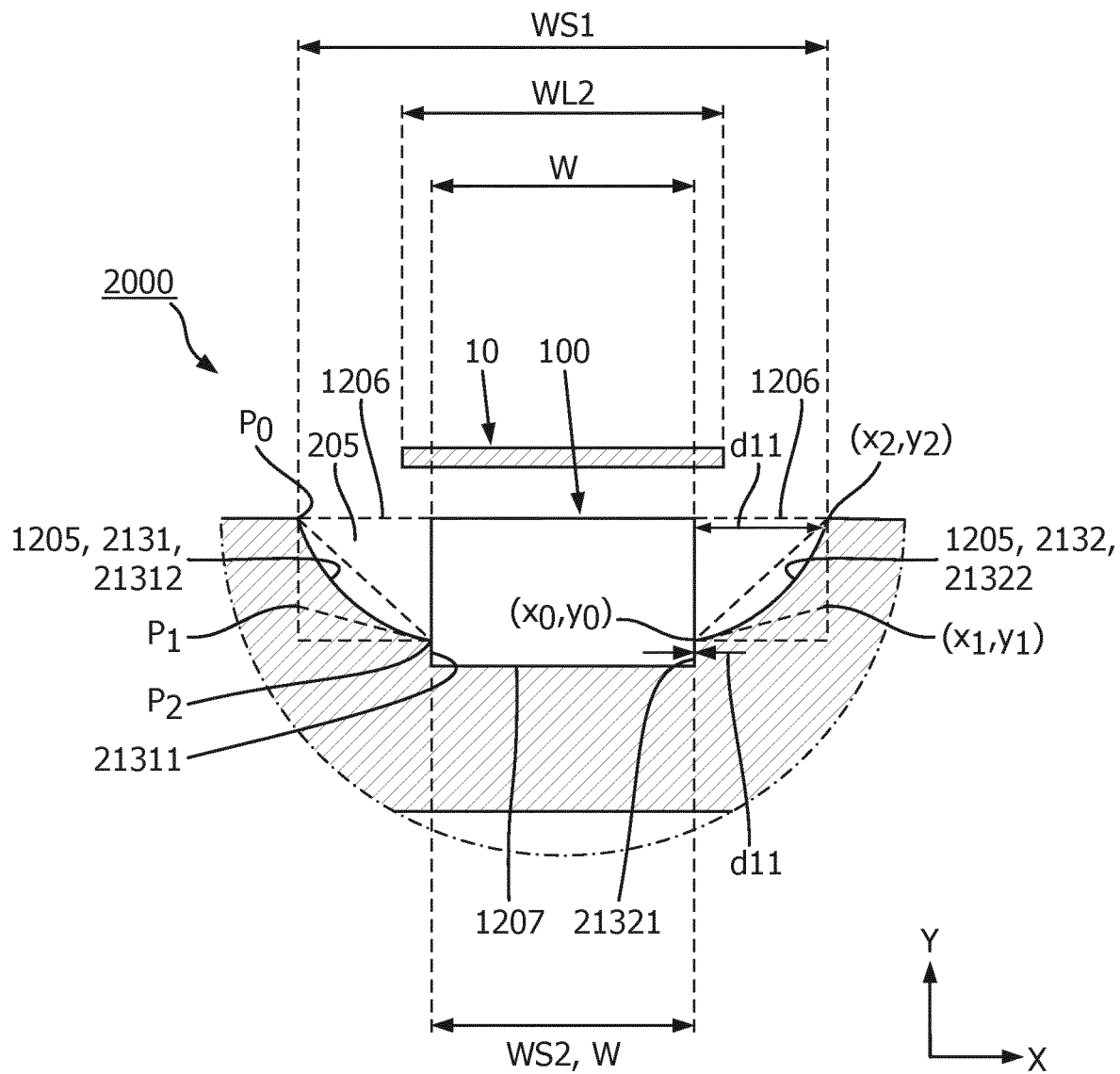

FIG. 4*h* schematically depict an embodiment wherein the taper part is not over the full height of the cavity. The elongated slit 205 comprises at the bottom a T-shaped part. this may be useful in view of positioning the elongated luminescent body. The body holder structure 2000 may comprise features that may essentially fixate the elongated luminescent body 100. This may prevent a sideways movement or rotation (in a plane perpendicular to the drawing), and/or may also prevent rotation along the axis of elongation A.

The cavity wall part having a Bezier curved shape is explained in relation to e.g. FIG. 4*g*. However, essentially the same may apply for the curved wall parts of FIGS. 4*c* and 4*f* The cavity wall part, that may especially be defined by the Bezier curve, indicated with reference BC, may be defined by a first end or first point, indicated with reference P1, closest to the slit opening 1206, and a second end or second point, indicated with reference P2, closest to the slit end 1207. The second end P2 may be relatively close to the elongated luminescent body 100. For instance, the second end P2 may be in thermal contact, such as physical contact, with the elongated luminescent body 100. The cavity wall parts 2131,2132, that may especially be defined by the Bezier curves, define concave cavity wall parts. As schematically depicted, the first P0 end and the second end P2 of the Bezier curve define two corners of a rectangle (dashed), which can be divided in two triangles with a straight line or diagonal (dashed) between these triangles (or shared by these triangles), which is a diagonal of the rectangle. In one of the triangles, the Bezier curve will be found, as the Bezier curve is curved. The Bezier curve may further be defined by an intermediate point (which is not on the Bezier curve), indicated with reference P1, which is defined within the triangle wherein the Bezier curve is found. The intermediate point may be chosen such, that incoupling is most efficient. Incoupling is not efficient when the intermediate point is not within one of the triangles (and only found in the triangle that allows a concave Bezier curve/concave wall part). The dashed lines to the point indicate the shortest connection between the first point P0 and the intermediate point P1, and between the intermediate point P1 and the second point P2.

The Bezier curve BC is especially a rational Bezier curve BC. The Bezier curve may be defined by:

$$B(t) = \frac{\sum_{i=0}^{n} \binom{n}{i} t^i (1-t)^{n-i} P_i w_i}{\sum_{i=0}^{n} \binom{n}{i} t^i (1-t)^{n-i} w_i}$$

Po is the first point, P2 is the second point, and P1 is the intermediate point. Especially, w0=w2=1. The value of w1 may be chosen from the range of about 0.4-1.5, especially at least 0.5, such as selected from the range of 0.5-1.2. P1 and w1 may be chosen such that light (source light) incoupling is most efficient (and thus the outcoupling via the radiation exit window is also largest). The value oft varies from 0 at the first point to 1 at the second point. Hence, t is a variable between 0-1 that defines all points on the Bezier curve. See especially the left cavity (part) in FIG. 4*i*).

For instance, w1 may be about 0.4-0.6. P2 and P0 can be defined as x0, y0 and x2, y2 respectively. P1 can be defined as x1, y1 respectively. Especially, for this notation see the right cavity (part) in FIG. 4*i*, wherein the x and y values are positioned in the first quadrant of an xy coordinate system, which also the basis for the further embodiments. The value of x1 is selected from the range of x0-x2, and the value of y1 is selected from the range of y0-y2. When x1=x0, y1≠y0 and y1≠y2. When x1=x2, y1≠y2 and y1≠y0. Especially, in embodiments (i) x1 may be selected from the range of (x0+x2)*0.5*xv, wherein xv is selected from the range of 0.6-1.4, and wherein y1<(y0+y2)*0.5, or y1 may be selected from the range of (y0+y2)*0.5*yv, wherein yv is selected from the range of 0.6-1.4, and wherein x1>(x0+x2)*0.5.

Figure 4J:
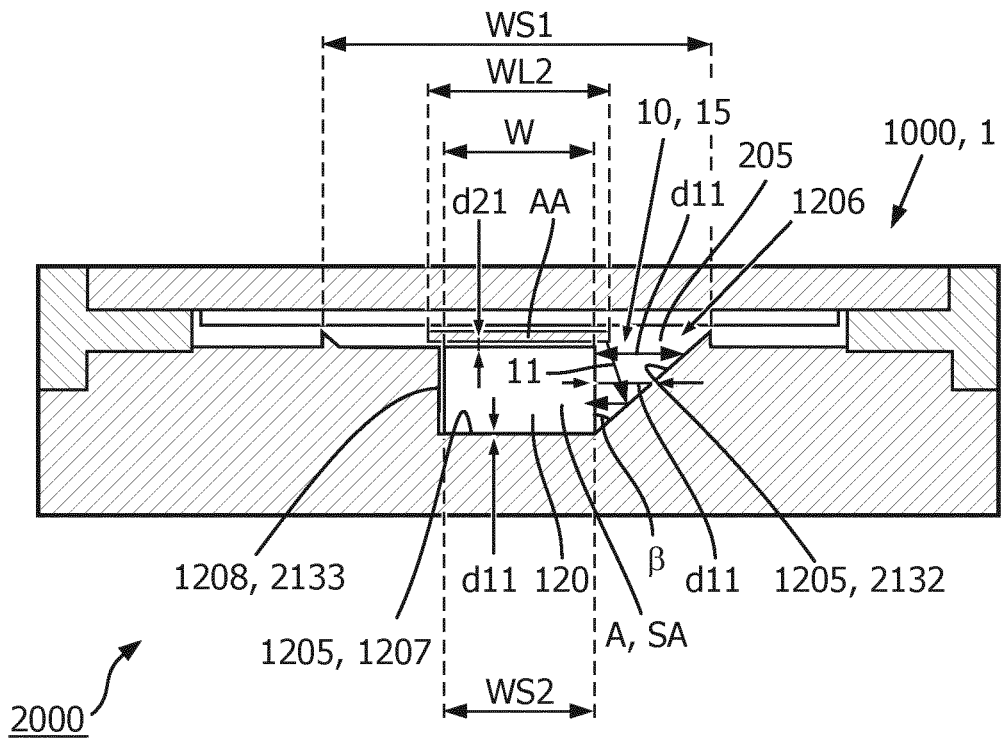

FIG. 4*j* schematically depicts an embodiment wherein the elongated slit 205 only extends along one side of the luminescent body 100. The cavity wall 1208, having the cavity wall part 2133, is conformal with the side wall of the luminescent body 100 facing the cavity wall 1208.

Figure 4K:
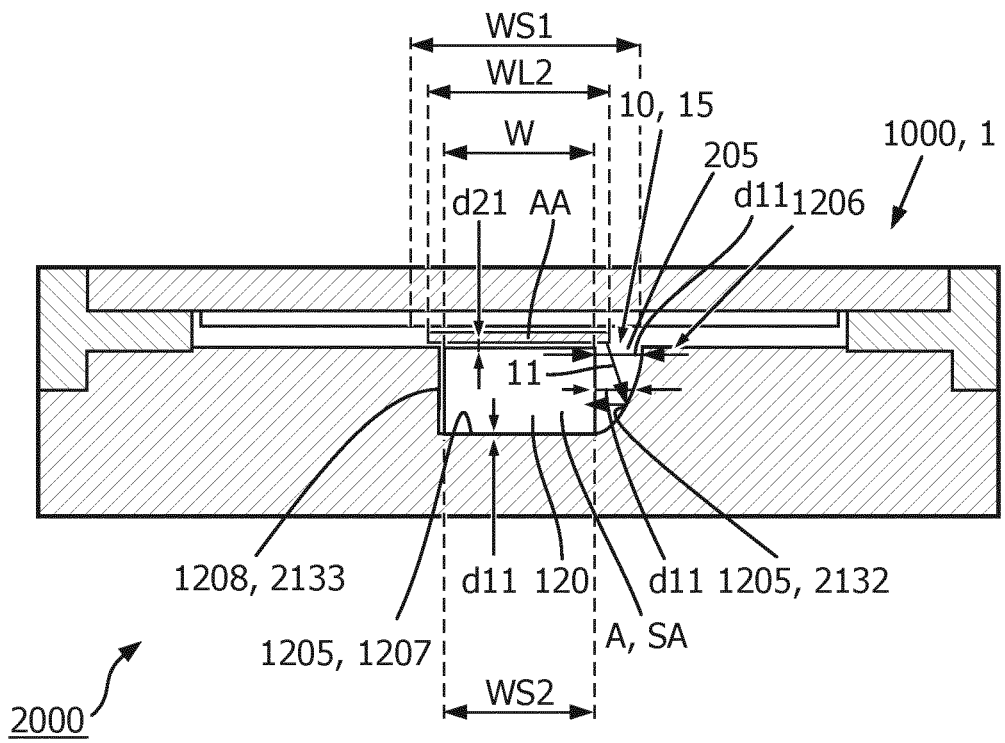

FIG. 4*k* schematically depicts an embodiment were the elongated slit 205 only extends along one side of the luminescent body 100. The cavity wall 1208, having the cavity wall part 2133, is conformal with the side wall of the luminescent body 100 facing the cavity wall 1208. The cavity wall part 2132 may have a Bezier shape like depicted in FIG. 4*g*. The embodiments shown in FIGS. 4*j* and 4*k* have the advantage that the cooling of the luminescent body 100 is improved via heat transfer at the side facing the cavity wall 1208 while the coupling of light 11 in the luminescent rod 100 is improved via cavity 205.

Figure 4L:
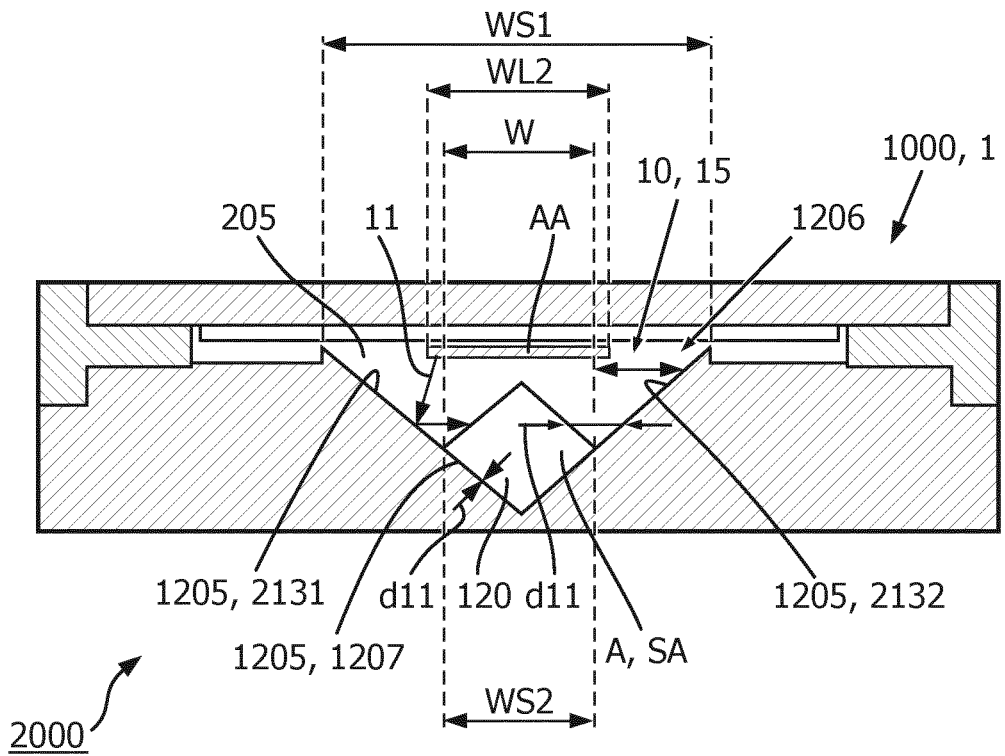

FIG. 4*l* schematically depicts an embodiments where the luminescent body 100 is positioned in the elongated slit 205 such that two sides of the luminescent body 100 are conformal with the cavity wall parts 2131, 2105. As a result, the cooling of the luminescent body 100 is improved while via the two other side surfaces of the luminescent body 100 light 11 is coupled into the luminescent body 100.

Figure 4M:
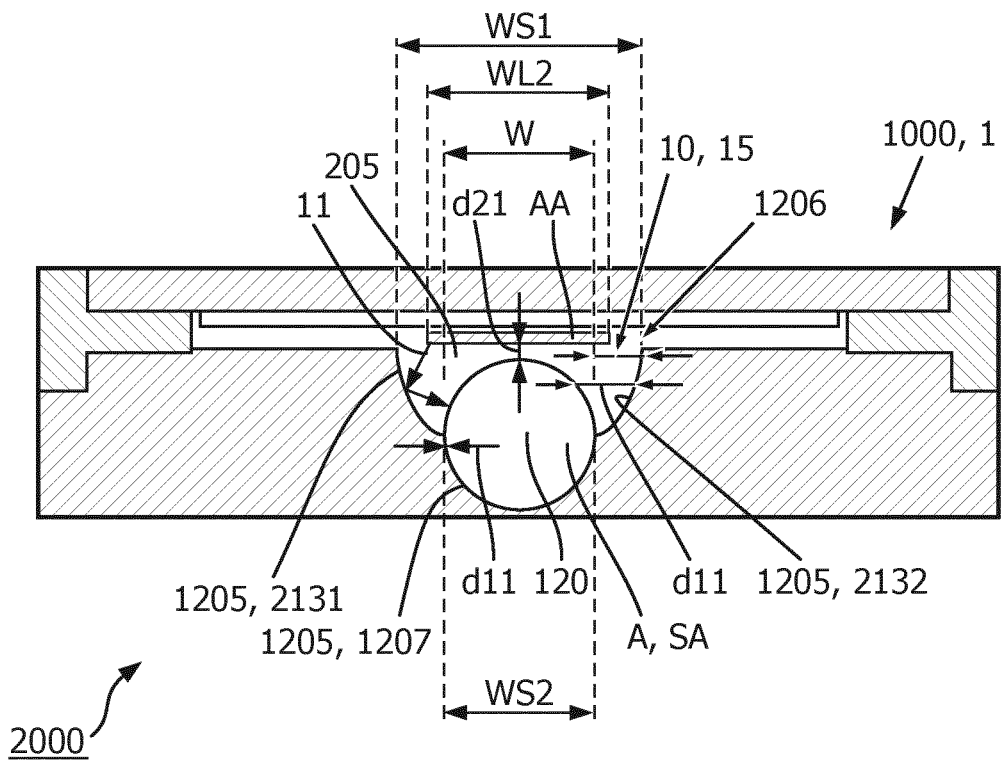

FIG. 4*m* schematically depicts an embodiments where the luminescent body 100 is a round body and is positioned in the elongated slit 205 such that at least 50% of the outer surface area of the luminescent body 100 is conformal with the cavity wall parts 2133, 1205. As a result, the cooling of the luminescent body 100 is improved while via the part of the surface area of the luminescent body 100 light 11 is coupled into the luminescent body 100.

It appears that (amongst others) the shape of the cavity may determine how efficient light incoupling can be obtained. When a lot of light needs to be coupled into the rod, a vast number of LEDs may be needed. Then, it may not be optimal to use a single row of LEDs, but instead, two rows (or more) of LEDs may be useful. When a rod width is smaller than the width of two LEDs, incoupling efficiency may not that high due to light falling next to the rod. This light is then considered to be "lost". Hence, in embodiments the width of a single (broad) die or the edge to edge width of a plurality of dies may be slightly smaller, essentially the same, or (slightly) larger than the width of the elongated luminescent body.

In an HLD module, the rod may be enclosed on three sides with aluminum cooling material. However, herein we (thus) propose to use a cavity created by giving the (e.g. aluminum) cooling material a certain hollow shape, a cavity, while exploiting the reflective properties of the cavity material. Besides, we provide placement tolerances of the LED relative to the rod for specific cavity designs, and are able to provide more robustness, thus leading to relaxed design tolerances resulting in cost down in the parts manufacturing and module assembly.

In the single-sided lighting concept some limitations have to be dealt with. As we only irradiate the rod from one side, it may be a challenge to couple enough light into only one side of the rod. The simplest solution would be to increase both the length of the LED strip and the luminescent rod. However, this may be relatively difficult. Furthermore, increasing the rod length would also increase the chance of failure of the module due to rod breakage/cracking. This invention may overcome these problems by using a cavity, that due to its specific cavity shape(s) can offer a solution that may increase the efficiency at a certain output level, while keeping the rod length the same.

Amongst others, it is proposed to use concave cavities with a Bezier like or (cross-sectional) circular shape, that redirects the light, that would otherwise fall next to the rod and be lost, onto the sides of the rod. The proposed shape designs do that with a high efficiency and are robust to placement tolerances of the LEDs relative to the rod.

It was observed that the LEDs, although they have only a width of 1.4 mm and a light emitting surface width of just 1.2 mm, may be wider than the luminescent rod when placed next to each other. In a non-cavity situation, light that does not direct hit the rod, would be lost, thus incoupling efficiency would be low. One of the proposed cavity shapes is shown in FIG. 4*f*, which is concave, and may have the shape of a Bezier curve.

The incoupling efficiency was determined for vertical wall, slanted walls, and curved walls. With vertical walls, the incoupling efficiency, defined as the amount of light that is entering the rod relative to the amount of light that is emitted by the LEDs, is in the order of 20% points lower than with slanted or curved (Bezier) walls. The sensibility to an offset of the array relative to the cavity is largest for a single row, and it was found that cavities with two rows of LEDs may be very tolerant to horizontal displacements. This may be caused by the fact that for a shift, one row of LEDs may have better incoupling, while the other row of LEDs may have worse incoupling, resulting in a net incoupling of almost exactly the same. Note that even for a single row cavity, the incoupling efficiency may not be 100% due to Fresnel reflection of the rod and the absorption of the LEDs themselves and the PCB after this reflection (a cavity reflection of 90%). Correspondingly, the efficiency would increase or decrease with a higher or lower reflection. In conclusion, amongst others it has been shown that cavity designs are possible that may have a very efficient incoupling efficiency. Further, it has been shown that there are designs that allow to increase the LED-rod distance at very low penalty, such as at a distance of at least 40 µm, or even at least 100 µm.

Amongst others, the invention provides the use of reflective cavities to increase coupling efficiency inside the rod. Further, the invention provides the use of shaped reflective walls to optimize the coupling efficiency. Yet further, the invention also provides a reflective cavity close or even touching the PCB's with the LED strings to maximize coupling efficiency and prevent light leakage. Further, the invention provides a reflective cavity that may couple only into parts of the rod sides (FIG. 4*d*). Yet further, the invention provides a reflective cavity with low reflectance for instance 30% or larger (may still give an improvement).

For instance, in embodiments the invention provides a reflective cavity made from aluminum. In embodiments, the reflective cavity may be specular reflective, especially highly specular reflective. In other embodiments, the reflective cavity may be diffuse reflective, especially highly diffuse reflective. Further, the invention may provide curved PCB's with LEDs or other light sources on it with also some direct coupling into sides. Yet further, the invention provides instead of LED strings other light sources for instance OLED.

Hence, amongst others the invention provides a cavity with a concave shape, such as a cavity which follows a Bezier type curve. The invention also provides a cavity which has a cylindrical shape. The invention further provides a cavity that is wide enough to be tolerant for displacement. Yet further, the cavity may have such a shape that it still has a high efficiency when the LEDs are placed at such a distance from the rods, that assembly without damage risk can be performed.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising a plurality of light sources, an elongated luminescent body, and a body holder structure, wherein:

the plurality of light sources are configured to provide light source light, wherein the light sources are solid state light sources, wherein the plurality of light sources are configured in a light source array;

the elongated luminescent body has a length and a width, wherein the elongated luminescent body comprises luminescent material configured to convert at least part of light source light into luminescent material light;

the body holder structure comprises an elongated slit for hosting the elongated luminescent body, wherein the elongated slit has a cavity wall defining the elongated slit and a slit opening, wherein the slit opening has a slit opening width WS1, wherein $WS1 \geq 1.05*W$, wherein the cavity wall and the elongated luminescent body have first shortest distances that vary over the cavity wall, wherein at least part of the cavity wall is reflective for light source light;

the light sources are configured at second shortest distances d21 from the elongated luminescent body, and wherein one or more of the plurality of light sources are configured to irradiate with the light source light the elongated luminescent body both (i) directly and (ii) indirectly via the cavity wall, characterized in that:

the elongated slit has a second slit width WS2 at a slit end most remote from the slit opening, wherein the slit opening and the slit end are bridged by cavity wall parts, wherein the second slit width at the slit end is smaller than the slit opening width, wherein WS1/WS2 is at least 1.1, the cavity wall parts comprise first parts that are configured conformal to part of the elongated luminescent body at first shortest distances selected from the range of ≥100 μm, wherein the first parts are configured closer to the slit end than to the slit opening, and the slit end is in thermal contact with the elongated luminescent body.

2. The light generating system according to claim 1, wherein:
the elongated luminescent body comprises one or more side faces, wherein the elongated luminescent body comprises a radiation input face and a radiation exit window, wherein the radiation input face is configured in a light receiving relationship with the plurality of light sources, wherein the radiation exit window has an angle (a) unequal to 0° and unequal to 180° with the radiation input face, and wherein the one or more of the plurality of light sources are configured to irradiate with the light source light both (i) the radiation input face of the elongated luminescent body directly and (ii) another part of the one or more side faces indirectly via the cavity wall; and wherein the elongated luminescent body and the light source array are configured parallel.

3. The light generating system according to claim 1, wherein the light source array has a light source array axis, wherein the light sources in the light source array have a largest edge-to-edge width perpendicular to the light source array axis, wherein the edge-to-edge width is larger than the width of the elongated luminescent body and equal to or smaller than the slit opening width, and wherein the second shortest distance is selected from the range of 10-500 μm.

4. The light generating system according to claim 3, wherein the cavity wall parts are straight and configured slanted, having a slant angle (β) relative to the elongated luminescent body selected from the range of 15-45°.

5. The light generating system according to claim 4, wherein the slant angle (β) is selected from the range of 20-40°.

6. The light generating system according to claim 3, wherein the cavity wall parts are curved, tapering in a direction from the slit opening to the slit end.

7. The light generating system according to claim 6, wherein the cavity wall parts have the shape of a Bezier curve.

8. The light generating system according to claim 3, wherein the cavity wall parts comprise second parts, configured closer to the slit opening than to the slit end, wherein the second parts taper in a direction from the slit opening (1206) to the first parts.

9. The light generating system according to claim 1, wherein the slit opening width and the width of the elongated luminescent body have a ratio selected from the range of 1.1≤WS1/W≤5.

10. The light generating system according to claim 1, further comprising n force applying elements configured to keep the elongated body in the elongated slit, wherein n is a natural number of at least 1.

11. The light generating system according to claim 10, wherein the n force applying elements comprise n spring elements, and wherein n is selected from the range of 2-4.

12. The light generating system according to claim 1, wherein the body holder structure comprises one or more heat transfer elements for guiding away heat from the elongated luminescent body, and comprising one or more second heat transfer elements for guiding away heat from the plurality of light sources.

13. The light generating system according to claim 1, wherein the elongated slit further comprises a cavity wall that is conformal with the side wall of the luminescent body facing the cavity wall.

14. The light generating system according to claim 13, wherein an outer surface area of the luminescent body in the range of 40-60% is conformal with the cavity walls of the elongated slit.

15. A projection system or a luminaire comprising the system according to claim 1.

* * * * *